United States Patent
Wang et al.

(10) Patent No.: US 12,506,633 B2
(45) Date of Patent: Dec. 23, 2025

(54) DEVICE REGISTRATION METHOD, HUB DEVICE, AND APPARATUS

(71) Applicant: HUAWEI TECHNOLOGIES CO., LTD., Shenzhen (CN)

(72) Inventors: Dehai Wang, Xi'an (CN); Lu Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 18/714,195

(22) PCT Filed: Nov. 15, 2022

(86) PCT No.: PCT/CN2022/131981
§ 371 (c)(1),
(2) Date: May 29, 2024

(87) PCT Pub. No.: WO2023/098468
PCT Pub. Date: Jun. 8, 2023

(65) Prior Publication Data
US 2025/0097065 A1    Mar. 20, 2025

(30) Foreign Application Priority Data
Nov. 30, 2021    (CN) .......................... 202111442096.3

(51) Int. Cl.
*H04L 12/28*    (2006.01)
(52) U.S. Cl.
CPC ................. *H04L 12/2807* (2013.01)
(58) Field of Classification Search
CPC .................................................. H04L 12/2807
See application file for complete search history.

(56) References Cited

U.S. PATENT DOCUMENTS

| | | | |
|---|---|---|---|
| 11,366,865 B1* | 6/2022 | Kuo | H04L 67/303 |
| 2008/0069319 A1* | 3/2008 | Igoe | H04L 12/2838 |
| | | | 379/90.01 |
| 2012/0182939 A1* | 7/2012 | Rajan | A61B 5/002 |
| | | | 370/328 |
| 2019/0357023 A1 | 11/2019 | Park | |
| 2023/0117615 A1* | 4/2023 | Yao | H04L 65/1073 |
| | | | 455/435.1 |

FOREIGN PATENT DOCUMENTS

CN    113055640 A    6/2021

OTHER PUBLICATIONS

Extended European Search Report in European Appln. No. 22900273.8, mailed on Dec. 19, 2024, 6 pages.
International Search Report and Written Opinion in International Appln. No. PCT/CN2022/131981, mailed on Feb. 9, 2023, 15 pages (with English translation).

* cited by examiner

*Primary Examiner* — Minh Chau Nguyen
(74) *Attorney, Agent, or Firm* — Fish & Richardson P.C.

(57) ABSTRACT

This application can be applicable to the field of the internet of things, and relates to a device registration method, a hub device, and an apparatus. In an example device registration method provided in this application, a hub device may register a target device with the hub device with assistance of first user equipment, and the hub device may register the hub device with a server with assistance of second user equipment. The hub device may register a registered device (which may include the target device that is registered with the hub device) with the server after the hub device registers the hub device with the server.

20 Claims, 20 Drawing Sheets

DEVICE REGISTRATION METHOD, HUB DEVICE, AND APPARATUS

CROSS-REFERENCE TO RELATED APPLICATIONS

This application is a national stage of International Application No. PCT/CN2022/131981, filed on Nov. 15, 2022, which claims priority to Chinese Patent Application No. 202111442096.3, filed on Nov. 30, 2021. Both of the aforementioned applications are hereby incorporated by reference in their entireties.

TECHNICAL FIELD

This application relates to the field of the internet of things, and in particular, to a device registration method, a hub device, and an apparatus.

BACKGROUND

In an account-based smart home solution, a smart home device may register with a specified user account (or establish a binding relationship with the specified user account) by communicating with a smart home platform on a cloud. Therefore, a user can conveniently use user equipment (such as a mobile phone or a tablet computer) that logs in to the specified user account to perform coordinated management on a plurality of smart home devices under the specified user account.

However, in some scenarios, the smart home device cannot communicate with the smart home platform on the cloud, and/or a user account with which the smart home device should be registered is not determined. In this case, a field engineer responsible for installing the smart home device cannot help a household complete a registration procedure, and the household needs to register every smart home device with the specified user account after the smart home device can communicate with the smart home platform on the cloud and the specified user account is determined. This is cumbersome and results in poor use experience.

SUMMARY

Embodiments of this application provide a device registration method, a hub device, and an apparatus, to resolve a problem that a household needs to register every smart home device in an existing smart home solution.

According to a first aspect, an embodiment of this application provides a device registration method that is applied to a hub device. The method includes:
  sending a first registration code to first user equipment in response to a first registration request sent by the first user equipment;
  registering a target device with the hub device after receiving the first registration code sent by the target device;
  receiving a second registration code sent by second user equipment, where the second user equipment and the first user equipment are same user equipment or different user equipment;
  registering the hub device with a server based on the second registration code; and
  registering a registered device with the server after the hub device is registered with the server, where the registered device includes the target device that is registered with the hub device.

It should be noted that, in a scenario in which a smart home device cannot communicate with a server, and/or a user does not determine a user account with which the smart home device is to be registered, if the user wants to perform coordinated management on all smart home devices, the user may use a hub device in a home as an edge server, and register the smart home device with the hub device.

Specifically, the user may perform a device registration operation on the first user equipment. In response to the device registration operation of the user, the first user equipment may determine the to-be-registered target device, and send the first registration request to the hub device.

The hub device may send the first registration code to the first user equipment in response to the first registration request.

The first user equipment may forward the first registration code to the target device after receiving the first registration code.

The target device may send the first registration code to the hub device after receiving the first registration code forwarded by the first user equipment.

The hub device may register the target device with the hub device after receiving the first registration code sent by the target device.

A process in which the first user equipment registers the target device with the hub device may be understood as a process in which the first user equipment grants an operation permission of the target device to the hub device. Registering, by the hub device, the target device with the hub device may be understood as registering, by the hub device, the operation permission of the target device on the hub device.

Therefore, after the first user equipment assists the hub device in registering each target device with the hub device, the hub device may obtain an operation permission of each registered device, and the user may perform coordinated management on registered devices with the hub device.

For example, in an installation scenario (that is, an application scenario in which some smart home devices are installed in a decoration phase before a house is delivered to a household), an Internet cable is not enabled in a home area, and it is difficult for a field engineer to learn a user account of the household. In this case, the field engineer may use user equipment of the field engineer to register each smart home device with the hub device according to the foregoing method.

Then, the field engineer or another user may perform, with the hub device, coordinated management on smart home devices that are registered with the hub device.

In addition, when the smart home device can communicate with the server, and a specified user account is determined, if the user wants to register the hub device and the registered device with the server, the foregoing server may be understood as a smart home platform on a cloud.

In this case, the user may perform a device delivery operation on the second user equipment that logs in to the first user account. The second user equipment may send a second registration request to the server in response to the device delivery operation of the user.

The server may send the second registration code to the second user equipment after receiving the second registration request.

The second user equipment forwards the second registration code to the hub device after receiving the second registration code.

The hub device may send the second registration code to the server after receiving the second registration code.

The server may register the hub device with the server after receiving the second registration code sent by the hub device.

After the hub device registers with the server, the hub device may send a third registration request to the server, and register the registered device with the server by using the third registration request.

Registering, by the hub device, the hub device and the registered device with the server may be understood as registering, by the hub device, operation permissions of the hub device and the registered device with the first user account of the server. The first user account is a currently logged-in user account of the second user equipment.

After the hub device and the registered device are registered with the server, the first user account has the operation permissions of the hub device and the registered device, and the second user equipment or another user equipment that logs in to the first user account may control the hub device and the registered device by using the first user account.

The first user equipment and the second user equipment may be same user equipment or different user equipment.

When the first user equipment and the second user equipment are different user equipment, a user using the second user equipment only needs to register the hub device with the server. The hub device can automatically register the registered device with the server. The user using the second user equipment does not need to register target devices with the server one by one. This greatly reduces operations that need to be performed by the user, effectively improves user experience, and has strong usability and practicability.

For example, in the installation scenario, the first user equipment may be the user equipment of the field engineer, and the second user equipment may be the user equipment of the household.

Before the house is delivered, the field engineer may use the first user equipment to help the household register, with the hub device, every smart home device installed in advance.

After the house is delivered, the household may use the second user equipment of the household to register the hub device with the server.

The hub device may automatically register the registered device with the server after the hub device is registered with the server. The household does not need to register the registered devices one by one. In this case, workload of the household can be greatly reduced, and use experience of the household can be effectively improved.

In a possible implementation of the first aspect, the method further includes:

instructing the server to cancel a registration relationship between the hub device and the server and/or a registration relationship between the registered device and the server after receiving a status restoration instruction.

It should be noted that when the hub device registers the hub device and the registered device with the server, the server binds the hub device and the registered device to the first user account.

Therefore, the registration relationship between the hub device and the server may be understood as a binding relationship between the hub device and the first user account, and the registration relationship between the registered device and the server may be understood as a binding relationship between the registered device and the first user account.

When the user wants to cancel the registration relationship between the hub device and the server and/or the registration relationship between the server and the registered device, the user equipment may directly perform an operation on the hub device to trigger the status restoration instruction, or the user may send the status restoration instruction to the hub device by using the user equipment of the user.

After the hub device obtains the status restoration instruction, the hub device may instruct the server to cancel the registration relationship between the hub device and the server and/or the registration relationship between the registered device and the server.

In a possible implementation of the first aspect, the instructing the server to cancel a registration relationship between the hub device and the server and/or a registration relationship between the registered device and the server includes:

sending a first unbinding instruction to the server, where the first unbinding instruction instructs the server to cancel the registration relationship between the registered device and the server; and sending a second unbinding instruction to the server after the registration relationship between the registered device and the server is canceled, where the second unbinding instruction instructs the server to cancel the registration relationship between the hub device and the server.

It should be noted that, in addition to performing registration on behalf of the registered device, the hub device may further cancel the registration relationship on behalf of the registered device.

The hub device may send the first unbinding instruction to the server after the hub device obtains the status restoration instruction.

The server may cancel the registration relationship between the registered device and the server after the server receives the first unbinding instruction.

The hub device may send the second unbinding instruction to the server after the registration relationship between the registered device and the server is canceled.

The server may cancel the registration relationship between the hub device and the server after the server receives the second unbinding instruction.

In other words, when the user wants to cancel the registration relationship between each registered device and the server, the user only needs to deliver the status restoration instruction to the hub device, and then, the hub device can automatically cancel the registration relationship between the hub device and the server and the registration relationship between the registered device and the server. The user does not need to cancel the registration relationship between the hub device and the server and the registration relationship between the registered device and the server one by one. This greatly reduces operations that need to be performed by the user and effectively improves user experience.

In a possible implementation of the first aspect, after the sending a first unbinding instruction to the server, the method further includes:

restoring the registration relationship between the hub device and the registered device.

It should be noted that, in a process of registering the target device with the hub device, because no user account is set in the hub device, after the target device is registered with the hub device, the registration relationship between the hub device and the registered device (that is, the target device that is registered with the hub device) may be understood as a primary-secondary relationship between the hub device and the registered device. The hub device is a primary device. The registered device is a secondary device of the hub device. The hub device has an operation permission of the registered device.

In some embodiments, the registered device may retain only one registration relationship.

In this scenario, when the registered device is registered with the server, the registration relationship between the hub device and the registered device is cancelled.

Therefore, the hub device may restore the registration relationship between the hub device and the registered device after canceling the registration relationship between the registered device and the server.

Then, according to the foregoing device registration method, it is convenient for the user to register the hub device and the registered device as a whole with another user account of the server. In this case, operations of re-registering the hub device and the registered device by the user can be reduced, and user experience can be improved.

For example, when the household wants to rent the house to a tenant, the tenant needs to hand over operation permissions of the hub device and the registered device to the tenant.

In this case, the user can issue a status restoration instruction to the hub device. The hub device may cancel, according to the state restoration instruction, the registration relationship between the registered device and the server and the registration relationship between the hub device and the server, and restore the registration relationship between the hub device and the registered device.

Then, the tenant may use the user equipment of the tenant, to register the hub device with the server and bind the hub device to a user account of the tenant.

The hub device may automatically register the registered device with the user account of the tenant after the hub device registers with the user account of the tenant.

In other words, according to the foregoing method, it is convenient for the household and the tenant to hand over the operation permissions of the hub device and the registered device to another user account as a whole, and the tenant does not need to register the hub device and the registered device one by one. This greatly reduces operations of the tenant and improves use experience of the tenant.

In a possible implementation of the first aspect, after the registering a target device with the hub device, the method further includes:
 receiving control information sent by third user equipment, where the control information includes a device identifier of a to-be-controlled registered device and a control instruction; and
 forwarding the control instruction to the registered device corresponding to the device identifier.

It should be noted that, after the registered device is registered with the hub device, the user may directly send the control information to the hub device by using the user equipment of the user, and control each registered device with the hub device.

In this case, the user may perform a control operation on the third user equipment. The third user equipment may determine the to-be-controlled registered device and the control instruction in response to the control operation. The control instruction instructs the to-be-controlled registration device to perform an operation specified by the user.

Then, the third user equipment may send the control information to the hub device, where the control information may include the device identifier of the to-be-controlled registered device and the control instruction.

After receiving the control information, the hub device may forward the control instruction to the registered device corresponding to the device identifier.

After receiving the foregoing control instruction, the to-be-controlled registered device may perform the operation corresponding to the foregoing control instruction.

In another possible implementation of the first aspect, after the registering a target device with the hub device, the method further includes:
 determining a to-be-controlled registered device and a control instruction in response to a control operation of a user; and
 sending the control instruction to the to-be-controlled registered device.

It should be noted that after the registered device is registered with the hub device, alternatively, the user may directly control each registered device with the hub device.

In this case, the user may directly perform the control operation on the hub device. The hub device may determine the to-be-controlled registered device and the control instruction in response to the control operation.

Then, the hub device may deliver the control instruction to the to-be-controlled registered device.

After receiving the foregoing control instruction, the to-be-controlled registered device may perform the operation corresponding to the foregoing control instruction.

According to a second aspect, an embodiment of this application provides a device registration method. The method includes:
 A hub device registers a target device with the hub device with assistance of first user equipment;
 the hub device registers the hub device with a server with assistance of second user equipment, where the second user equipment and the first user equipment are same user equipment or different user equipment; and
 the hub device registers a registered device with the server after the hub device registers the hub device with the server, where the registered device includes the target device that is registered with the hub device.

It should be noted that, in a scenario in which a smart home device cannot communicate with a server, and/or a user does not determine a user account with which the smart home device is to be registered, if the user wants to perform coordinated management on all smart home devices, the user may use a hub device in a home as an edge server, and register the smart home device with the hub device.

Specifically, with assistance of the first user equipment, the hub device may register the target device with the hub device.

In this case, with assistance of the second user equipment, the hub device may register the hub device with the server.

After the hub device is registered with the server, the hub device may perform registration on behalf of the registered device, and register the registered device with the server.

The first user equipment and the second user equipment may be same user equipment or different user equipment.

When the first user equipment and the second user equipment are different user equipment, a user using the second user equipment only needs to register the hub device with the server. The hub device can automatically register the registered device with the server. The user using the second user equipment does not need to register target devices with the server one by one. This greatly reduces operations that need to be performed by the user, effectively improves user experience, and has strong usability and practicability.

In a possible implementation of the second aspect, the method further includes:

The hub device instructs the server to cancel a registration relationship between the hub device and the server and/or a registration relationship between the registered device and the server after obtaining a status restoration instruction.

It should be noted that, when the user wants to cancel the registration relationship between the hub device and the server and/or the registration relationship between the server and the registered device, the user equipment may directly perform an operation on the hub device to trigger the status restoration instruction, or the user may send the status restoration instruction to the hub device by using the user equipment of the user.

After the hub device obtains the status restoration instruction, the hub device may instruct the server to cancel the registration relationship between the hub device and the server and/or the registration relationship between the registered device and the server.

In a possible implementation of the second aspect, that a hub device registers a target device with the hub device with assistance of first user equipment specifically includes:

The first user equipment determines the to-be-registered target device in response to a device registration operation of a user, and sending a first registration request to the hub device:
- the hub device sends a first registration code to the first user equipment in response to the first registration request, so that the first user equipment sends the first registration code to the target device; and
- the target device sends the first registration code to the hub device, and the hub device registers the target device with the hub device in response to receiving the first registration code.

It should be noted that in a process of registering the target device with the hub device, the user may perform a device registration operation on the first user equipment. In response to the device registration operation of the user, the first user equipment may determine the to-be-registered target device, and send the first registration request to the hub device.

The hub device may send the first registration code to the first user equipment in response to the first registration request.

The first user equipment may forward the first registration code to the target device after receiving the first registration code.

The target device may send the first registration code to the hub device after receiving the first registration code forwarded by the first user equipment.

The hub device may register the target device with the hub device after receiving the first registration code sent by the target device.

A process in which the first user equipment registers the target device with the hub device may be understood as a process in which the first user equipment grants an operation permission of the target device to the hub device. Registering, by the hub device, the target device with the hub device may be understood as registering, by the hub device, the operation permission of the target device on the hub device.

Therefore, after the first user equipment assists the hub device in registering each target device with the hub device, the hub device may obtain an operation permission of each registered device, and the user may perform coordinated management on registered devices with the hub device.

For example, in an installation scenario (an application scenario in which some smart home devices are installed in a decoration phase before a house is delivered to a household), an Internet cable is not enabled in a home area, and it is difficult for a field engineer to learn a user account of the household. In this scenario, the field engineer may use user equipment of the field engineer to register each smart home device with the hub device according to the foregoing method.

Then, the field engineer or another user may perform, with the hub device, coordinated management on smart home devices that are registered with the hub device.

In a possible implementation of the second aspect, that the hub device registers the hub device with a server with assistance of second user equipment specifically includes:

The second user equipment sends a second registration request to the server in response to a device delivery operation of a user;
- the server sends a second registration code to the second user equipment in response to the second registration request, so that the second user equipment sends the second registration code to the hub device; and
- the hub device registers the hub device with the server in response to receiving the second registration code.

It should be noted that, in a process of registering the hub device with the server, the user may perform a device delivery operation on the second user equipment that logs in to the first user account. The second user equipment may send a second registration request to the server in response to the device delivery operation of the user.

The server may send the second registration code to the second user equipment after receiving the second registration request.

The second user equipment forwards the second registration code to the hub device after receiving the second registration code.

The hub device may send the second registration code to the server after receiving the second registration code.

The server may register the hub device with the server after receiving the second registration code sent by the hub device.

In a possible implementation of the second aspect, that the hub device instructs the server to cancel a registration relationship between the hub device and the server and/or a registration relationship between the registered device and the server after obtaining a status restoration instruction specifically includes:

The hub device sends a first unbinding instruction to the server after obtaining the status restoration instruction;
- the server cancels the registration relationship between the registered device and the server in response to the first unbinding instruction;
- the hub device sends a second unbinding instruction to the server after the registration relationship between the registered device and the server is canceled; and
- the server cancels the registration relationship between the hub device and the server in response to the second unbinding instruction.

It should be noted that, in addition to performing registration on behalf of the registered device, the hub device may further cancel the registration relationship on behalf of the registered device.

The hub device may send the first unbinding instruction to the server after the hub device obtains the status restoration instruction.

The server may cancel the registration relationship between the registered device and the server after the server receives the first unbinding instruction.

The hub device may send the second unbinding instruction to the server after the registration relationship between the registered device and the server is canceled.

The server may cancel the registration relationship between the hub device and the server after the server receives the second unbinding instruction.

In other words, when the user wants to cancel the registration relationship between each registered device and the server, the user only needs to deliver the status restoration instruction to the hub device, and then, the hub device can automatically cancel the registration relationship between the hub device and the server and the registration relationship between the registered device and the server. The user does not need to cancel the registration relationship between the hub device and the server and the registration relationship between the registered device and the server one by one. This greatly reduces operations that need to be performed by the user and effectively improves user experience.

In a possible implementation of the second aspect, after the first unbinding instruction is sent to the server, the method further includes:

The hub device restores the registration relationship between the hub device and the registered device.

It should be noted that, in some embodiments, the registered device may retain only one registration relationship.

In this scenario, when the registered device is registered with the server, the registration relationship between the hub device and the registered device is cancelled.

Therefore, the hub device may restore the registration relationship between the hub device and the registered device after canceling the registration relationship between the registered device and the server.

Then, according to the foregoing device registration method, it is convenient for the user to register the hub device and the registered device as a whole with another user account of the server. In this case, operations of re-registering the hub device and the registered device by the user can be reduced, and user experience can be improved.

In a possible implementation of the second aspect, after that a hub device registers a target device with the hub device, the method further includes:

Third user equipment determines a to-be-controlled registered device and a control instruction in response to a control operation of the user:

the third user equipment sends control information to the hub device, where the control information includes a device identifier of the to-be-controlled registered device and the control instruction; and in response to receiving the control information, the hub device forwards the control instruction to the registered device corresponding to the device identifier.

It should be noted that, after the registered device is registered with the hub device, the user may directly send the control information to the hub device by using the user equipment of the user, and control each registered device with the hub device.

In another possible implementation of the second aspect, after that a hub device registers a target device with the hub device with assistance of first user equipment, the method further includes:

The hub device determines a to-be-controlled registered device and a control instruction in response to a control operation of the user; and the hub device sends the control instruction to the to-be-controlled registered device.

It should be noted that after the registered device is registered with the hub device, alternatively, the user may directly perform a control operation on the hub device, and control each registered device with the hub device.

According to a third aspect, an embodiment of this application provides a device registration apparatus that is applied to a hub device. The apparatus includes:

a first sending module, configured to send a first registration code to first user equipment in response to a first registration request sent by the first user equipment;

a first registration module, configured to register a target device with the hub device after receiving the first registration code sent by the target device;

a second receiving module, configured to receive a second registration code sent by second user equipment, where the second user equipment and the first user equipment are same user equipment or different user equipment;

a second registration module, configured to register the hub device with a server based on the second registration code; and a third registration module, configured to register a registered device with the server after the hub device is registered with the server, where the registered device includes the target device that is registered with the hub device.

In a possible implementation of the third aspect, the apparatus further includes:

a registration cancellation module, configured to instruct the server to cancel a registration relationship between the hub device and the server and/or a registration relationship between the registered device and the server after a status restoration instruction is obtained.

In a possible implementation of the third aspect, the registration cancellation module includes:

a first unbinding submodule, configured to send a first unbinding instruction to the server, where the first unbinding instruction instructs the server to cancel the registration relationship between the registered device and the server; and a second unbinding submodule, configured to send a second unbinding instruction to the server after the registration relationship between the registered device and the server is canceled, where the second unbinding instruction instructs the server to cancel the registration relationship between the hub device and the server.

In a possible implementation of the third aspect, the apparatus further includes:

a registration restoration module, configured to restore the registration relationship between the hub device and the registered device.

In a possible implementation of the third aspect, the apparatus further includes:

a control receiving module, configured to receive control information sent by third user equipment, where the control information includes a device identifier of a to-be-controlled registered device and a control instruction; and a relay control module, configured to forward the control instruction to the registered device corresponding to the device identifier.

In another possible implementation of the third aspect, the apparatus further includes:

a control response module, configured to determine a to-be-controlled registered device and a control instruction in response to a control operation of a user; and a direct control module, configured to send the control instruction to the to-be-controlled registered device.

According to a fourth aspect, an embodiment of this application provides a device registration system, where the system includes a hub device, first user equipment, second user equipment, and a target device. The hub device is configured to:

register a target device with the hub device with assistance of first user equipment;

register the hub device with a server with assistance of second user equipment, where the second user equipment and the first user equipment are same user equipment or different user equipment; and register a registered device with the server after the hub device registers the hub device with the server, w % here the registered device includes the target device that is registered with the hub device.

In a possible implementation of the fourth aspect, the hub device is further configured to:

instruct the server to cancel a registration relationship between the hub device and the server and/or a registration relationship between the registered device and the server after receiving a status restoration instruction.

In a possible implementation of the fourth aspect, in a process in which the hub device registers the target device with the hub device with assistance of first user equipment;

the first user equipment is configured to determine the to-be-registered target device in response to a device registration operation of a user, and send a first registration request to the hub device;

the hub device is configured to send the first registration code to the first user equipment in response to the first registration request;

the first user equipment is further configured to send the first registration code to the target device;

the target device is configured to send the first registration code to the hub device; and the hub device is further configured to register the target device with the hub device in response to receiving the first registration code.

In a possible implementation of the fourth aspect, in a process in which the hub device registers the hub device with the server with assistance of the second user equipment;

the second user equipment is configured to send a second registration request to the server in response to a device delivery operation of a user;

the server is configured to send a second registration code to the second user equipment in response to the second registration request;

the second user equipment is further configured to send the second registration code to the hub device; and the hub device is further configured to register the hub device with the server in response to receiving the second registration code.

In a possible implementation of the fourth aspect, in a process in which the hub device instructs the server to cancel the registration relationship between the hub device and the server and/or the registration relationship between the registered device and the server after obtaining the status restoration instruction:

The hub device is configured to send a first unbinding instruction to the server after obtaining the status restoration instruction:

the server is configured to cancel the registration relationship between the registered device and the server in response to the first unbinding instruction;

the hub device is further configured to send a second unbinding instruction to the server after the registration relationship between the registered device and the server is canceled; and the server is configured to cancel the registration relationship between the hub device and the server in response to the second unbinding instruction.

In a possible implementation of the fourth aspect, the hub device is further configured to restore the registration relationship between the hub device and the registered device.

In a possible implementation of the fourth aspect, the system further includes third user equipment.

The third user equipment is configured to determine a to-be-controlled registered device and a control instruction in response to a control operation of the user.

The third user equipment is further configured to send control information to the hub device, where the control information includes a device identifier of the to-be-controlled registered device and the control instruction.

The hub device is further configured to: in response to receiving the control information, forward the control instruction to the registered device corresponding to the device identifier.

In a possible implementation of the fourth aspect, the hub device is further configured to:

determine a to-be-controlled registered device and a control instruction in response to a control operation of the user; and send the control instruction to the to-be-controlled registered device.

According to a fifth aspect, an embodiment of this application provides a hub device, including a memory, a processor, and a computer program that is stored in the memory and that is run on the processor. When executing the computer program, the hub device is configured to implement the method according to any one of the first aspect or the possible implementations of the first aspect.

According to a sixth aspect, an embodiment of this application provides a computer-readable storage medium, where the computer-readable storage medium is configured to store a computer program. When the computer program is executed by a processor, the method according to any one of the first aspect or the possible implementations of the first aspect is implemented.

According to a seventh aspect, an embodiment of this application provides a computer program product. When the computer program product is configured to run on a hub device, the hub device is enabled to perform the method according to any one of the first aspect or the possible implementations of the first aspect.

According to an eighth aspect, an embodiment of this application provides a chip system. The chip system includes a memory and a processor. The processor is configured to execute a computer program stored in the memory, to implement the method according to any one of the first aspect or the possible implementations of the first aspect.

Compared with the conventional technology, embodiments of this application have the following beneficial effects.

According to the device registration method in this application, with assistance of first user equipment, a hub device may register a target device with the hub device. In this case, with assistance of second user equipment, the hub device may register the hub device with a server. After the hub device is registered with the server, the hub device may become a proxy of the registered device (that is, a target device that is registered with the hub device), and automatically register the registered device with the server.

To be specific, after the first user equipment registers the registered device with the hub device, the second user equipment only needs to register the hub device with the server. The hub device can automatically register the registered device with the server. The second user equipment does not need to register target devices with the server one by one. This greatly reduces operations that need to be performed by the user using the second user equipment, effectively improves user experience, and has strong usability and practicability.

DESCRIPTION OF EMBODIMENTS

Figure 1:
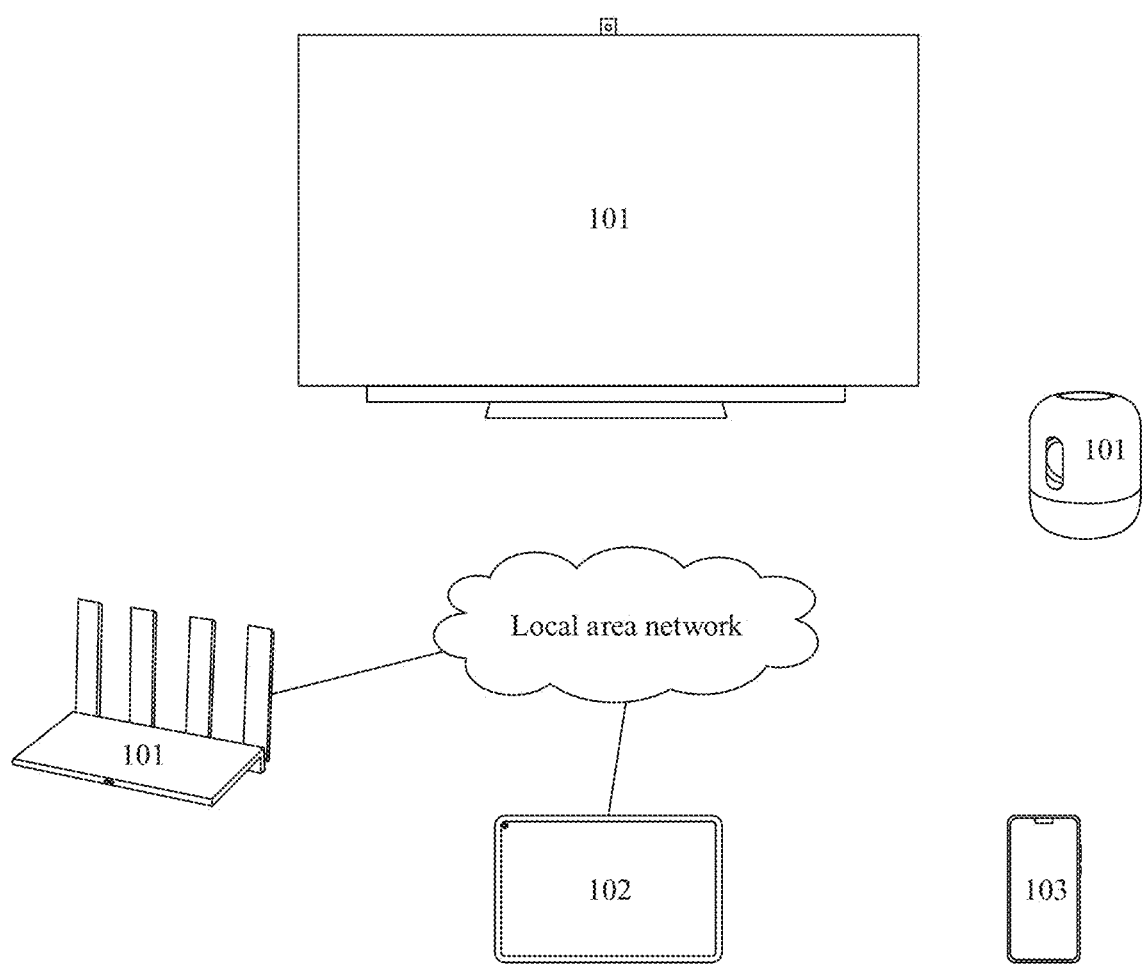
FIG. 1 is a diagram of a system architecture of a device registration system according to an embodiment of this application.

In the following description, to illustrate rather than limit, specific details such as a particular system structure and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in this specification and the claims of this application, the term "include" indicates presence of described features, entireties, steps, operations, elements, and/or components, but does not exclude presence or addition of one or more other features, entireties, steps, operations, elements, components, and/or collections thereof.

It should be further understood that the term "and/or" used in this specification and the claims of this application indicates any combination and all possible combinations of one or more items listed in association, and includes the combinations.

As used in the specification and the appended claims of this application, the term "if" may be interpreted as "when", "once", "in response to determining", or "in response to detecting" depending on the context. Similarly, the phrase "if it is determined" or "if the [described condition or event] is detected" may be interpreted as "once determined" or "in response to determining" or "once the [described condition or event] is detected" or "in response to detecting the [described condition or event]" depending on the context.

In addition, in the descriptions of this specification and the claims of this application, the terms "first", "second", "third", and the like are merely used for differentiation and description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean a same embodiment. Instead, the statements mean "one or more but not all of the embodiments", unless otherwise specifically emphasized. Terms "include", "contain", "have", and variants of the terms all mean "include but are not limited to", unless otherwise specifically emphasized.

In a current smart home solution, many smart home devices support a registration function. When connected to the Internet, these smart home devices may exchange data with a smart home platform on a cloud and register with a specified user account.

In this case, if user equipment (for example, a mobile phone or a tablet computer) logs in to a specified user account, the user may perform coordinated management on the plurality of smart home devices under the specified user account with the user equipment.

For example, it is assumed that the user equipment is a mobile phone, and the plurality of smart home devices are registered with the specified user account.

In this case, if the mobile phone logs in to the specified user account, the user may directly manage each smart home device registered with the specified user account by using the mobile phone, and the mobile phone does not need to establish connections to the smart home devices one by one.

In a process of registering the smart home device, the smart home device needs to communicate with the smart home platform on the cloud. Currently, most smart home devices do not support a cellular network. Therefore, a smart home device needs to access an electronic device that has a routing function and that is connected to a network in a home (hereinafter referred to as a routing device), to implement communication with the smart home platform on the cloud.

However, in an application scenario in which some smart home devices are installed in a decoration phase before a house is delivered to the household (hereinafter referred to as an installation scenario), because the house is not delivered to the household, the household usually does not enable an Internet cable. As a result, the routing device cannot connect to the Internet via the Internet cable, and the smart home device cannot access the smart home platform and cannot perform registration.

In addition, in the installation scenario, it is difficult for a field engineer responsible for installing the smart home device to know a user account of a household, and cannot determine a user account with which the installed smart home device is to be registered.

Therefore, when the smart home device cannot communicate with the smart home platform on the cloud and/or the user account with which the smart home device is to be registered is not determined, the field engineer cannot help the household complete a registration procedure in advance, and the household needs to register the smart home devices with the specified user account one by one after the Internet cable in the home is enabled and the specified user account is determined.

Because there are a plurality of smart home devices in the home, the household needs to perform a large quantity of operations when registering the smart home devices, which greatly affects use experience of the household.

In view of this, an embodiment of this application provides a device registration method. When a smart home device cannot access the Internet, and a user account of a household is not determined, user equipment may register the smart home device with a hub device, so that a user can perform coordinated management on all smart home devices with the hub device.

An embodiment of this application further provides a device registration method. When a smart home device can access the Internet and a specified user account for registration is determined, a user can conveniently register, with the specified user account, a smart home device that is registered with a hub device (in other words, establish a binding relationship with the specified user account), and the user does not need to perform registration separately. In this case, operations that need to be performed by the user are reduced, and user experience is improved.

An embodiment of this application further provides a device registration method. When a binding relationship between a specified user account and a smart home device needs to be canceled, the smart home device registered with a smart home platform on a cloud can be rolled back to a state of registering only with a hub device. In this way, a user can conveniently hand over operation permissions of the smart home device and the hub device to another user, and may retain information configured during coordinated management of smart home devices, for example, retain various smart scenarios.

An application scenario of the solution provided in embodiments of this application is described by using the foregoing installation scenario as an example. However, it should be understood that this does not constitute a limitation on a scenario to which the solution provided in embodiments of this application is applicable, a technical problem that can be resolved, and a coverage area. The solutions provided in this embodiment of this application may also be applied to any other appropriate scenario, to resolve a corresponding technical problem.

First, refer to FIG. 1. FIG. 1 shows an example of a device registration system to which an embodiment of this application is applicable. The device registration system may be disposed in a home area.

As shown in FIG. 1, the device registration system may include one or more smart home devices 101 (only three devices are shown in FIG. 1), one or more hub devices 102 (only one device is shown in FIG. 1), and user equipment 103.

The smart home device 101 is an internet of things device in a home area. The smart home device may include one or more of electronic devices of types such as a desktop computer, a notebook computer, a tablet computer, a smart television, a smart screen, a smart sound box, a smart air conditioner, a robot vacuum, a dishwasher, a smart light, a smart lock, a smart curtain, a router, a Lidar, a millimeter-wave radar, a smart lock, or a visual doorbell.

A smart home device 101 having a routing function (hereinafter referred to as a routing device) may create a local area network. The other smart home devices 101 may access the local area network, or may not access the local area network.

The hub device 102 is an electronic device that can control the smart home devices 101. The hub device 102 may be a central control home electronic device dedicated to controlling the house-wide smart home devices 101. Alternatively, the hub device 102 may be a smart home device 101 on which home hub software is installed. The home hub software may enable an existing smart home device 101 (for example, a router or a smart screen) in the house to implement control and intelligent decision-making on the house-wide smart home devices 101 based on an existing function of the smart home device 101.

For example, in some scenarios, the hub device 102 may be a central control screen, and a user may control the smart home device 101 with the central control screen. In some other scenarios, the hub device 102 may be a smart screen on which home central software is installed, and the user may control another smart home device 101 with the smart screen. In some other scenarios, the hub device 102 may be a smart speaker on which home central software is installed, and the user may control the another smart home device 101 with the smart speaker.

In an actual application scenario, the hub device 102 may access the local area network to control the smart home devices 101 in the local area network.

The user equipment 103 is personal equipment of the user, and may be understood as a non-shared electronic device such as a mobile phone or a smart wearable device. If the user equipment 103 is used by the user as a smart home device 101, the user equipment 103 may also be understood as the smart home device 101.

It should be understood that, in this embodiment of this application, a device is not specifically limited to the smart home device 101, the hub device 102, or the user equipment 103. A role of the device in a specific phase should be defined based on functions and roles of the device in different phases of a registration system.

The smart home device 101, the hub device 102, and the user equipment 103 may exchange data through one or more of communication connections such as a Wi-Fi connection, a Bluetooth connection, a universal serial bus (universal serial bus, USB) connection, a registered jack 45 (Registered Jack 45, RJ45) connection, and a power line communication (power line communication, PLC) connection.

In some possible application solutions, the foregoing device registration system may be applied to an installation scenario. Specifically, the installation scenario may refer to a scenario in which various smart home devices are installed and configured in a house by a field engineer of a smart home solution provider or a real estate developer before the house is delivered to a household.

Usually, the household applies for a broadband service and opens a home network after house delivery. Therefore, in the installation phase, the smart home device cannot connect to the Internet and cannot register with the smart home platform on the cloud. In an existing smart home solution, in this scenario, a field engineer cannot help the household complete a registration procedure in advance, and cannot implement coordinated management of smart home devices.

When the device registration method provided in this embodiment of this application is applied, the field engineer may register various smart home devices with the hub device in the installation scenario. The hub device may be understood as an edge cloud (also referred to as an edge server). Therefore, in the installation phase, the field engineer can perform coordinated management on smart home devices with the hub device.

In addition, after the installation is completed and the house is delivered to the household, the household may register the hub device by using user equipment that logs in to a user account of the household, and register the hub device with the user account of the household. After registration of the hub device is completed, the hub device may perform registration on behalf of another smart home device that is registered with the hub device, and register, with the user account of the household, the another smart home device that is registered with the hub device. Therefore, the household does not need to register the smart home devices one by one. In this case, operations of the household can be reduced, and use experience of the household can be improved.

Figure 2:
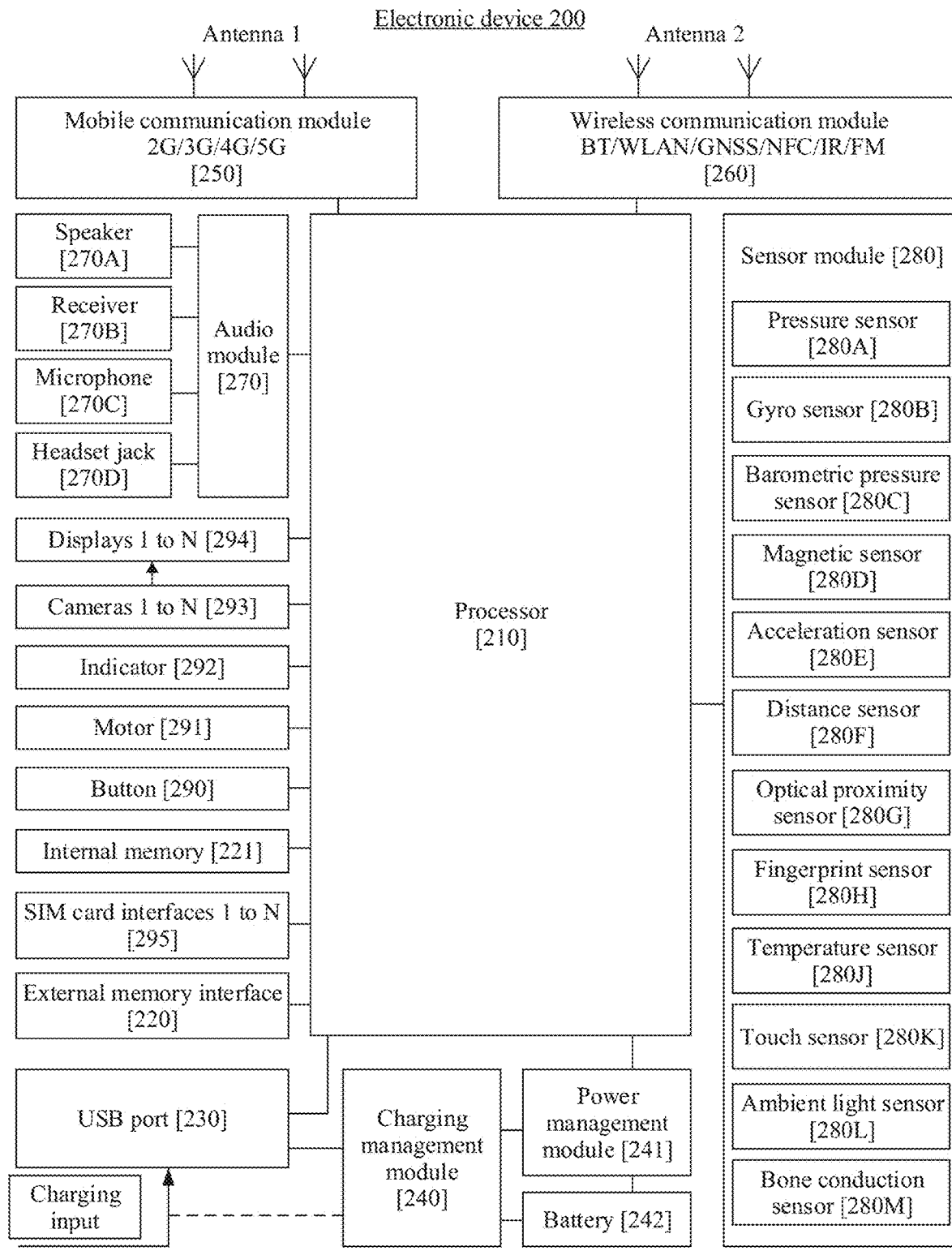
FIG. 2 is a schematic diagram of a structure of an electronic device according to an embodiment of this application.

Refer to FIG. 2. FIG. 2 is an example schematic diagram of a structure of an electronic device 200 according to an embodiment of this application. The electronic device 200 may be the foregoing smart home device 101, the hub device 102, or the user equipment 103.

The electronic device 200 may include a processor 210, an external memory interface 220, an internal memory 221, a universal serial bus (universal serial bus, USB) port 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, a subscriber identity module (subscriber identity module, SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on instruction operation code and a time sequence signal, to control instruction reading and instruction execution.

A memory may be further disposed in the processor 210, and is configured to store instructions and data. In some embodiments, the memory in the processor 210 is a cache. The memory may store an instruction or data that has been used or is cyclically used by the processor 210. If the processor 210 needs to use the instruction or the data again, the processor may directly invoke the instruction or the data from the memory. This avoids repeated access, reduces waiting time of the processor 210, and improves system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 210 may include a plurality of groups of I2C buses. The processor 210 may be separately coupled to the touch sensor 280K, a charger, a flashlight, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the electronic device 200.

The I2S interface may be used for audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transfer an audio signal to the wireless communication module 260 through the I2S interface, to implement a function of answering a call through a Bluetooth headset.

The PCM interface may also be used for audio communication, and analog signal sampling, quantization, and coding. In some embodiments, the audio module 270 may be coupled to the wireless communication module 260 through a PCM bus interface. In some embodiments, the audio module 270 may alternatively transfer an audio signal to the wireless communication module 260 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually used to connect the processor 210 to the wireless communication module 260. For example, the processor 210 communicates with a Bluetooth module in the wireless communication module 260 through the UART interface, to implement a Bluetooth function. In some embodiments, the audio module 270 may transmit an audio signal to the wireless communication module 260 through the UART interface, to implement a function of playing music by using a Bluetooth headset.

The MIPI interface may be configured to connect the processor 210 to a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 through the CSI, to implement a photographing function of the electronic device 200. The processor 210 communicates with the display 294 through the DSI, to implement a display function of the electronic device 200.

The GPIO interface may be configured by using software. The GPIO interface may be configured as a control signal or a data signal. In some embodiments, the GPIO interface may be configured to connect the processor 210 to the camera 293, the display 294, the wireless communication module 260, the audio module 270, the sensor module 280, or the like. The GPIO interface may be further configured as the I2C interface, the I2S interface, the UART interface, the MIPI, or the like.

The USB port 230 is an interface that conforms to a USB standard specification, and may be specifically a mini USB port, a micro USB port, a USB Type C interface, or the like. The USB port 230 may be configured to connect to a charger to charge the electronic device 200, or may be configured to transmit data between the electronic device 200 and a peripheral device, or may be configured to connect to a headset, to play an audio by using a headset. The port may be further configured to connect to another electronic device such as an AR device.

It may be understood that an interface connection relationship between the modules shown in this embodiment of the present invention is merely an example for description, and does not constitute a limitation on the structure of the electronic device 200. In some other embodiments of this application, the electronic device 200 may alternatively use an interface connection manner different from those in the foregoing embodiment, or use a combination of a plurality of interface connection manners.

The charging management module 240 is configured to receive a charging input from the charger. The charger may be a wireless charger or a wired charger. In some embodiments of wired charging, the charging management module 240 may receive a charging input from a wired charger through the USB port 230. In some embodiments of wireless charging, the charging management module 240 may receive a wireless charging input through a wireless charging coil of the electronic device 200. The charging management module 240 may further supply power to the electronic device by using the power management module 241 while charging the battery 242.

The power management module 241 is configured to connect the battery 242, the charging management module 240, and the processor 210. The power management module 241 receives an input of the battery 242 and/or the charging management module 240, to supply power to the processor 210, the internal memory 221, the display 294, the camera 293, the wireless communication module 260, and the like. The power management module 241 may be configured to monitor parameters such as a battery capacity, a battery cycle count, and battery health (electric leakage and impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented through the antenna 1, the antenna 2, the mobile communication module 250, the wireless communication module 260, the modem processor, the baseband processor, and the like.

The antenna 1 and the antenna 2 are configured to transmit and receive an electromagnetic wave signal. Each antenna in the electronic device 200 may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communication module 250 may provide a solution that is for wireless communication including 2G, 3G, 4G, 5G, or the like and that is applied to the electronic device 200. The mobile communication module 250 may include at least one filter, a switch, a power amplifier, a low noise amplifier (low noise amplifier, LNA), and the like. The mobile communication module 250 may receive an electromagnetic wave through the antenna 1, perform processing such as filtering or amplification on the received electromagnetic wave, and transmit the electromagnetic wave to the modem processor for demodulation. The mobile communication module 250 may further amplify a signal modulated by the modem processor, and convert the signal into an electromagnetic wave for radiation through the antenna 1. In some embodiments, at least some functional modules of the mobile communication module 250 may be disposed in the processor 210. In some embodiments, at least some functional modules of the mobile communication module 250 and at least some modules of the processor 210 may be disposed in one device.

The modem processor may include a modulator and a demodulator. The modulator is configured to modulate a to-be-sent low frequency baseband signal into a medium or high frequency signal. The demodulator is configured to demodulate a received electromagnetic wave signal into a low frequency baseband signal. Then the demodulator transmits the low frequency baseband signal obtained through demodulation to the baseband processor for processing. The low frequency baseband signal is processed by the baseband processor and then transmitted to the application processor. The application processor outputs a sound signal by using an audio device (which is not limited to the speaker 270A, the receiver 270B, or the like), or displays an image or a video by using the display 294. In some embodiments, the modem processor may be an independent component. In some other embodiments, the modem processor may be independent of the processor 210, and the modem processor and the mobile communication module 250 or another functional module may be disposed in one device.

The wireless communication module 260 may provide a wireless communication solution that is applied to the electronic device 200 and that includes a wireless local area network (wireless local area network, WLAN) (for example, a wireless fidelity (wireless fidelity. Wi-Fi) network). Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like. The wireless communication module 260 may be one or more components integrating at least one communication processor module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

In some embodiments, in the electronic device 200, the antenna 1 and the mobile communication module 250 are coupled, and the antenna 2 and the wireless communication module 260 are coupled, so that the electronic device 200 can communicate with a network or another device by using a wireless communication technology. The wireless communication technology may include technologies such as a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access, TD-CDMA), long term evolution (long term evolution, LTE), BT, a GNSS, a WLAN, NFC, FM, and/or IR. The GNSS may include a global positioning system (global positioning system. GPS), a global navigation satellite system (global navigation satellite system, GLONASS), a BeiDou navigation satellite system (BeiDou navigation satellite system, BDS), a quasi-zenith satellite system (quasi-zenith satellite system. QZSS), and/or satellite based augmentation systems (satellite based augmentation systems, SBAS).

The electronic device 200 may implement a display function through the GPU, the display 294, the application processor, and the like. The GPU is a microprocessor for image processing, and is connected to the display 294 and the application processor. The GPU is used for mathematical and geometric computation, and image rendering. The processor 210 may include one or more GPUs that execute program instructions to generate or change display information.

The display 294 is configured to display an image, a video, or the like. The display 294 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 200 may include one or N displays 294, where N is a positive integer greater than 1.

The electronic device 200 can implement a photographing function by using the ISP, the camera 293, the video codec, the GPU, the display 294, the application processor, and the like.

The ISP is configured to process data fed back by the camera 293. For example, during photographing, when a shutter is open, light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, luminance, and complexion of an image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, so that the electrical signal is converted into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may process other digital signals other than the digital image signal. For example, when the electronic device 200 selects a frequency, the digital signal processor is configured to perform Fourier transform on frequency energy.

The video codec is configured to compress or decompress a digital video. The electronic device 200 may support one or more types of video codecs. Therefore, the electronic device 200 may play or record videos in a plurality of coding formats, for example, moving picture experts group (moving picture experts group, MPEG)-1, MPEG-2, MPEG-3, and MPEG-4.

The NPU is a neural-network (neural-network. NN) computing processor. The NPU quickly processes input information with reference to a structure of a biological neural network, for example, a transfer mode between human brain neurons, and can continuously perform self-learning. Applications such as intelligent cognition of the electronic device 200, for example, image recognition, facial recognition, speech recognition, and text understanding, may be implemented through the NPU.

The external memory interface 220 may be used to connect to an external storage card, for example, a micro SD card, to extend a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The internal memory 221 may include a program storage area and a data storage area. The program storage area may store an operating system, an application required by at least one function (for example, a sound playing function or an image playing function), and the like. The data storage area may store data (such as audio data and contacts) created during use of the electronic device 200, and the like. In addition, the internal memory 221 may include a high-speed random access memory, and may further include a nonvolatile memory, for example, at least one magnetic disk storage device, a flash storage device, or a universal flash storage (universal flash storage, UFS). The processor 210 executes various functional applications and data processing of the electronic device 200 by running instructions stored in the internal memory 221 and/or instructions stored in the memory disposed in the processor.

The electronic device 200 may implement audio functions, for example, music playing and recording, by using the audio module 270, the speaker 270A, the receiver 270B, the microphone 270C, the headset jack 270D, the application processor, and the like.

The audio module 270 is configured to convert digital audio information into an analog audio signal for output, and is also configured to convert an analog audio input into a digital audio signal. The audio module 270 may be further configured to code and decode an audio signal. In some embodiments, the audio module 270 may be disposed in the processor 210, or some functional modules of the audio module 270 are disposed in the processor 210.

The speaker 270A, also referred to as a "loudspeaker", is configured to convert an electrical audio signal into a sound signal. The electronic device 200 may be configured to listen to music or answer a call in a hands-free mode over the speaker 270A.

The receiver 270B, also referred to as an "earpiece", is configured to convert an electrical audio signal into a sound signal. When a call is answered or audio information is listened to by using the electronic device 200, the receiver 270B may be put close to a human ear to listen to a voice.

The microphone 270C, also referred to as a "mike" or a "mic", is configured to convert a sound signal into an electrical signal. When making a call or sending speech information, a user may place the mouth of the user near the microphone 270C to make a sound, to input a sound signal to the microphone 270C. At least one microphone 270C is disposed in the electronic device 200. In some other embodiments, two microphones 270C may be disposed in the electronic device 200, to collect a sound signal and further implement a noise cancellation function. In some other embodiments, three, four, or more microphones 270C may be disposed in the electronic device 200, to collect a sound signal, implement noise cancellation, and identify a sound source, implement a directional recording function, and the like.

The headset jack 270D is configured to connect to a wired headset. The headset jack 270D may be the USB port 230 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and can convert the pressure signal into an electrical signal. In some embodiments, the pressure sensor 280A may be disposed on the display 294. There are a plurality of types of pressure sensors 280A, such as a resistive pressure sensor, an inductive pressure sensor, and a capacitive pressure sensor. The capacitive pressure sensor may include at least two parallel plates including conductive materials. When a force is applied to the pressure sensor 280A, capacitance between electrodes changes. The electronic device 200 determines pressure intensity based on a capacitance change. When a touch operation is performed on the display 294, the electronic device 200 detects intensity of the touch operation through the pressure sensor 280A. The electronic device 200 may calculate a touch location based on a detection signal of the pressure sensor 280A. In some embodiments, touch operations that are performed at a same touch location but have different touch intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyro sensor 280B may be configured to determine a motion posture of the electronic device 200. In some embodiments, an angular velocity of the electronic device 200 around three axes (that is, axes x, y, and z) may be determined by using the gyro sensor 280B. The gyro sensor 280B may be configured to implement image stabilization during photographing. For example, when a shutter is pressed, the gyro sensor 280B detects an angle at which the electronic device 200 jitters, calculates, based on the angle, a distance for which a lens module needs to compensate, and allows the lens to cancel the jitter of the electronic device 200 through reverse motion, to implement image stabilization. The gyro sensor 280B may be further used in a navigation scenario and a motion-sensing gaming scenario.

The barometric pressure sensor 280C is configured to measure barometric pressure. In some embodiments, the electronic device 200 calculates an altitude based on a value of a barometric pressure measured by the barometric pressure sensor 280C, to assist in positioning and navigation.

The magnetic sensor 280D includes a Hall sensor. The electronic device 200 may detect opening and closing of a flip cover by using the magnetic sensor 280D. In some embodiments, when the electronic device 200 is a clamshell, the electronic device 200 may detect opening and closing of a flip cover based on the magnetic sensor 280D. Further, a feature such as automatic unlocking upon opening is set based on a detected opening or closing state of the flip cover or a clamshell.

The acceleration sensor 280E may detect acceleration in various directions (usually on three axes) of the electronic device 200. When the electronic device 200 is still, a magnitude and a direction of gravity may be detected. The acceleration sensor 280E may be further configured to identify a posture of the electronic device, and is used in an application such as switching between a landscape mode and a portrait mode or a pedometer.

The distance sensor 280F is configured to measure a distance. The electronic device 200 may measure a distance by using infrared or laser. In some embodiments, in a photographing scenario, the electronic device 200 may measure a distance by using the distance sensor 280F, to implement quick focusing.

The optical proximity sensor 280G may include, for example, a light-emitting diode (LED) and an optical detector, for example, a photodiode. The light-emitting diode may be an infrared light-emitting diode. The electronic device 200 emits infrared light by using the light-emitting diode. The electronic device 200 detects infrared reflected light from a nearby object by using a photodiode. When sufficient reflected light is detected, the electronic device 200 may determine that there is an object near the electronic device 200. When insufficient reflected light is detected, the electronic device 200 may determine that there is no object near the electronic device 200. The electronic device 200 may detect, by using the optical proximity sensor 280G, that the user holds the electronic device 200 close to an ear for a call, to automatically turn off a screen for power saving. The optical proximity sensor 280G may also be used in a flip cover mode or a pocket mode to automatically unlock or lock the screen.

The ambient light sensor 280L is configured to sense ambient light brightness. The electronic device 200 may adaptively adjust brightness of the display 294 based on the sensed ambient light brightness. The ambient light sensor 280L may also be configured to automatically adjust a white balance during photographing. The ambient light sensor 280L may also cooperate with the optical proximity sensor 280G to detect whether the electronic device 200 is in a pocket, to avoid an accidental touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 200 executes a temperature processing policy based on the temperature detected by the temperature sensor 280J. For example, when the temperature reported by the temperature sensor 2803 exceeds a threshold, the electronic device 200 lowers performance of a processor near the temperature sensor 280J, to reduce power consumption and implement thermal protection. In some other embodiments, when the temperature is less than another threshold, the electronic device 200 heats the battery 242 to prevent the electronic device 200 from abnormal shutdown due to a low temperature. In some other embodiments, when the temperature is less than still another threshold, the electronic device 200 boosts an output voltage of the battery 242 to avoid abnormal shutdown due to a low temperature.

The touch sensor 280K is also referred to as a "touch device". The touch sensor 280K may be disposed on the display 294, and the touch sensor 280K and the display 294 form a touchscreen, which is referred to as a "touch screen". The touch sensor 280K is configured to detect a touch operation performed on or near the touch sensor. The touch sensor may transfer the detected touch operation to the application processor to determine a type of a touch event. A visual output related to the touch operation may be provided through the display 294. In some other embodiments, the touch sensor 280K may alternatively be disposed on a surface of the electronic device 200 at a location different from a location of the display 294.

The bone conduction sensor 280M may obtain a vibration signal. In some embodiments, the bone conduction sensor 280M may obtain a vibration signal of a vibration bone of a human vocal part. The bone conduction sensor 280M may also be in contact with a human pulse, and receive a blood pressure beating signal. In some embodiments, the bone conduction sensor 280M may alternatively be disposed in the headset, to constitute a bone conduction headset. The audio module 270 may obtain a voice signal through parsing based on the vibration signal that is of the vibration bone of the vocal part and that is obtained by the bone conduction sensor 280M, to implement a voice function. The application processor may parse heart rate information based on the blood pressure beating signal obtained by the bone conduction sensor 280M, to implement a heart rate detection function.

The button 290 includes a power button, a volume button, and the like. The button 290 may be a mechanical button, or may be a touch button. The electronic device 200 may receive a key input, and generate a key signal input related to user settings and function control of the electronic device 200.

The motor 291 may generate a vibration prompt. The motor 291 may be configured to produce an incoming call vibration prompt and a touch vibration feedback. For example, touch operations performed on different applications (for example, photographing and audio playing) may correspond to different vibration feedback effects. For touch operations performed on different areas of the display 294, the motor 291 may also correspond to different vibration feedback effects. Different application scenarios (for example, time reminding, information receiving, an alarm clock, and gaming) may also correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or removed from the SIM card interface 295, to implement contact with or separation from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into one SIM card interface 295. The plurality of cards may be of a same type, or may be of different types. Different types of SIM cards are compatible in the SIM card interface 295. The SIM card interface 295 is also compatible with an external storage card. The electronic device 200 interacts with a network through the SIM card, to implement functions such as calling and data communication. In some embodiments, the electronic device 200 uses an eSIM, that is, an embedded SIM card. The eSIM card may be embedded into the electronic device 200, and cannot be separated from the electronic device 200.

It may be understood that the structure shown in this embodiment of this application does not constitute a specific limitation on the electronic device 200. In some other embodiments of this application, the electronic device 200 may include more or fewer components than those shown in the figure, some components are combined, some components are split, or a different component arrangement may be used. The components shown in the figure may be implemented by using hardware, software, or a combination of software and hardware.

The following describes in detail a device registration method provided in an embodiment of this application based on the device registration system shown in FIG. 1, the electronic device shown in FIG. 2, and a specific application scenario.

1. Access a Local Area Network.

As described above, user equipment may be a personal device of a user, and the user usually carries the user equipment. Therefore, the user equipment may enter or leave a home area as the user moves.

When the user equipment enters the home area, the user equipment may discover a local area network provided by a routing device.

In this case, if the user equipment has never accessed the local area network, the user equipment may obtain local area network connection information in response to a connection operation of the user, and access the local area network based on the local area network connection information.

If the user equipment has ever accessed the local area network, the user equipment may automatically access the local area network based on the local area network connection information recorded by the device.

For example, it is assumed that the user equipment is a mobile phone, a local area network is set in the home area, and a service set identifier (Service Set Identifier, SSID) of the local area network is "H123".

Figure 3:
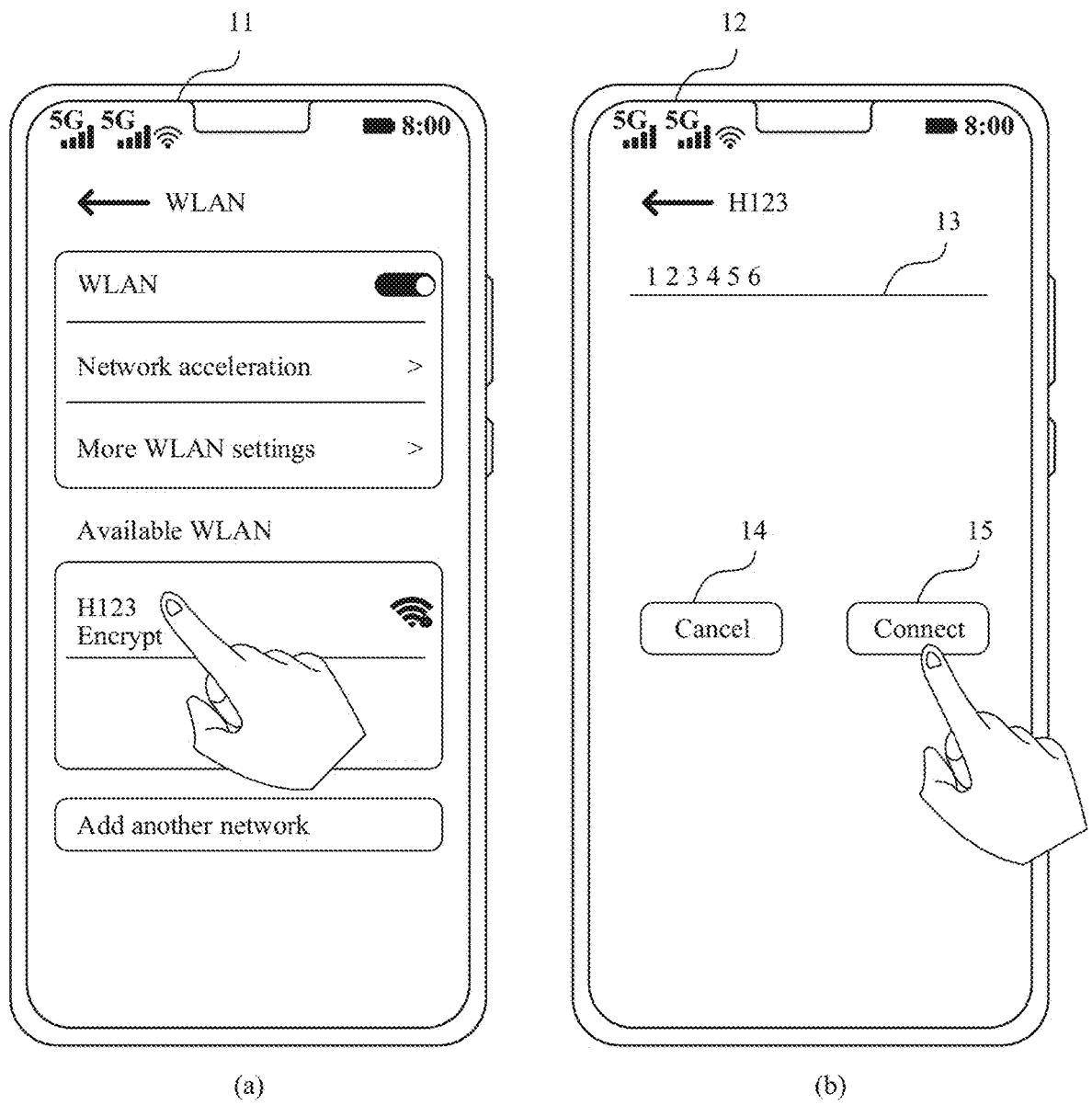
FIG. 3 is a schematic diagram of a scenario according to an embodiment of this application.

As shown in (a) in FIG. 3, when the user carries the mobile phone and enters the home area for the first time, the mobile phone may discover the local area network, and display the SSID of the local area network in a wireless local area network (Wireless Local Area Network, WLAN) search interface 11.

After the user taps an option of "H123" in the WLAN search interface 11, as shown in (b) in FIG. 3, the mobile phone may display a WLAN connection interface 12. The WLAN connection interface 12 includes a password field 13, a "Cancel" control 14, and a "Connect" control 15.

After the user enters a connection password "123456" in the password field 13, and taps the "Connect" control 15, the mobile phone may access the local area network "H123" based on the connection password, and the mobile phone may record the SSID and the connection password of the local area network.

Then, if the user carrying the mobile phone enters the home area again, the mobile phone may automatically access the local area network "H123" based on the locally recorded connection password "123456" after discovering the local area network "H123".

2. Log in to a Hub Device.

If no internet cable is enabled in the home area, a smart home device in the home area cannot access the Internet or communicate with a smart home platform on a cloud. In this case, the user equipment cannot register the smart home device in the home area, and cannot perform coordinated management on the smart home device in the home area.

Therefore, when no internet cable is enabled in the home area, after accessing the local area network, the user equipment may use the hub device as an edge server, log in to the hub device, register the smart home device with the hub device, and control, by using the hub device, the smart home device that is registered with the central device.

A manner in which the user equipment logs in to the hub device may be set based on an actual requirement.

For example, in some possible implementations, an administrator account and an administrator password that are used for login are preset on the hub device.

The administrator account and administrator password can be set based on an actual requirement. For example, the administrator account may be set to "000001", and the administrator password may be set to "123456".

Figure 4:
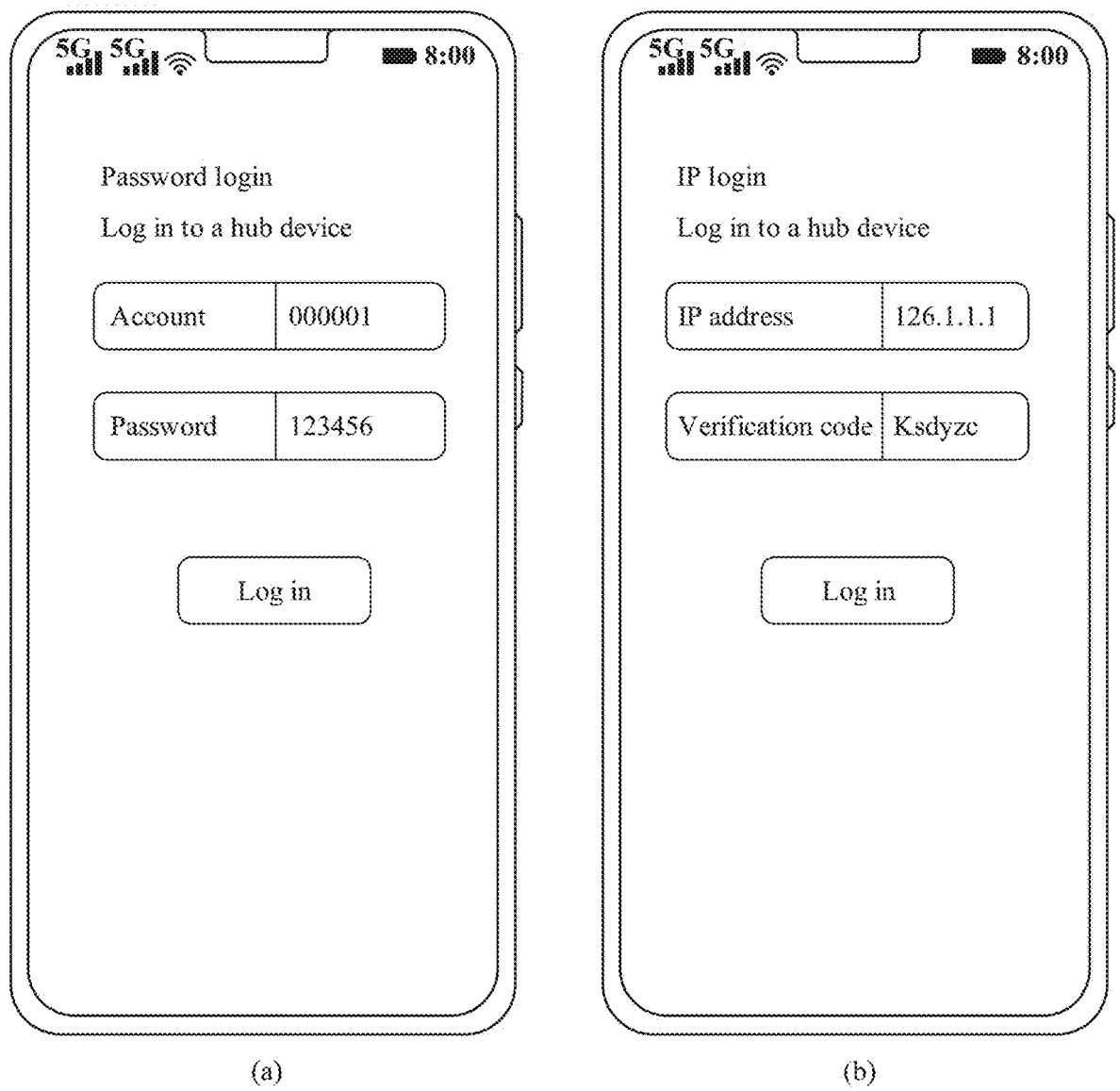
FIG. 4 is a schematic diagram of another scenario according to an embodiment of this application.

In this case, as shown in (a) in FIG. 4, after the user equipment accesses the local area network, the user may open a smart home device management application (for example, an "installation and maintenance application"), to enter a login interface. Then, the user can enter the administrator account "000001" and the administrator password "123456" in the login interface.

The user equipment may log in to the hub device based on the administrator account "000001" and the administrator password "123456" in response to an input operation of the user.

In some other possible implementations, the hub device may be provided with a display, and an Internet Protocol (Internet Protocol, IP) address of the hub device in the local area network and a randomly generated verification code are displayed on the display.

For example, it is assumed that the IP address displayed on the display of the hub device is "126.1.1.1", and the randomly generated verification code is "Ksdyzc". In this case, as shown in (b) in FIG. 4, after viewing the IP address and the verification code that are displayed on the display of the hub device, the user may enter the IP address "126.1.1.1" and the verification code "Ksdyzc" of the hub device in the login interface of the user equipment.

The user equipment may log in to the hub device based on the IP address "126.1.1.1" and the verification code "Ksdyzc" in response to an input operation of the user.

In some other possible implementations, the user equipment may also log in to the hub device in another manner such as facial recognition, fingerprint recognition, or gesture recognition. A manner in which the user equipment logs in to the hub device is not limited in this embodiment of this application.

It should be noted that the user may include users of one or more of types, for example, a field engineer and a household. A type of the foregoing user is not limited in this embodiment of this application.

For example, in an installation scenario, before a house is delivered, a field engineer may use an installation and maintenance device (for example, a mobile phone or a notebook computer of the field engineer) to log in to the hub device. After the house is delivered, the household may use a personal device (for example, a mobile phone of the household) to log in to the hub device. The field engineer and the household can be considered as users.

3. Register the Device.

After the user equipment logs in to the hub device, if the user equipment detects a device registration operation of the user, the user equipment may register a selected smart home device (hereinafter referred to as a target device) with the hub device.

Specifically, the user may perform a device registration operation on the user equipment. The user equipment may determine the target device in response to the device registration operation, and send a first registration request to the hub device.

After receiving the first registration request, the hub device may return a first registration parameter to the user equipment. The first registration parameter may include a first registration code.

Optionally, the first registration parameter may further include a first device identifier. After the target device is registered, the first device identifier may be used as an identity of the target device.

After receiving the first registration parameter, the user equipment may establish a connection with the target device, and send first registration information to the target device. The first registration information may include an identifier of the hub device and the first registration parameter.

The identifier of the hub device is used to search for the hub device. The identifier of the hub device may include one or more of identifiers such as an IP address of the hub device, a physical (Media Access Control, MAC) address of the hub device, and a product serial number (Serial Number, SN) of the hub device.

Optionally, the first registration information may further include local area network connection information. The local area network connection information may include the SSID and the connection password of the local area network. In some embodiments, the foregoing local area network connection information may be stored on the user equipment. In some other embodiments, the foregoing local area network connection information may also be input by the user in a process of performing the device registration operation.

When the target device receives the first registration information, if the target device has not accessed the local area network, the target device may access the local area network based on the local area network connection information.

If the target device has accessed the local area network, the target device may search for the hub device based on the identifier information of the hub device, and establish a connection with the hub device.

Then, the target device may send a first registration code to the hub device.

When the hub device receives the first registration code, the hub device may verify the received first registration code with the delivered first registration code.

If the received first registration code is consistent with the delivered first registration code, it indicates that the verification succeeds, and the hub device may register the target device with the hub device, and send first credential information to the target device, to complete a registration procedure.

If the received first registration code is inconsistent with the delivered first registration code, it indicates that the verification fails, and the hub device may refuse to register the target device with the hub device.

Figure 5:
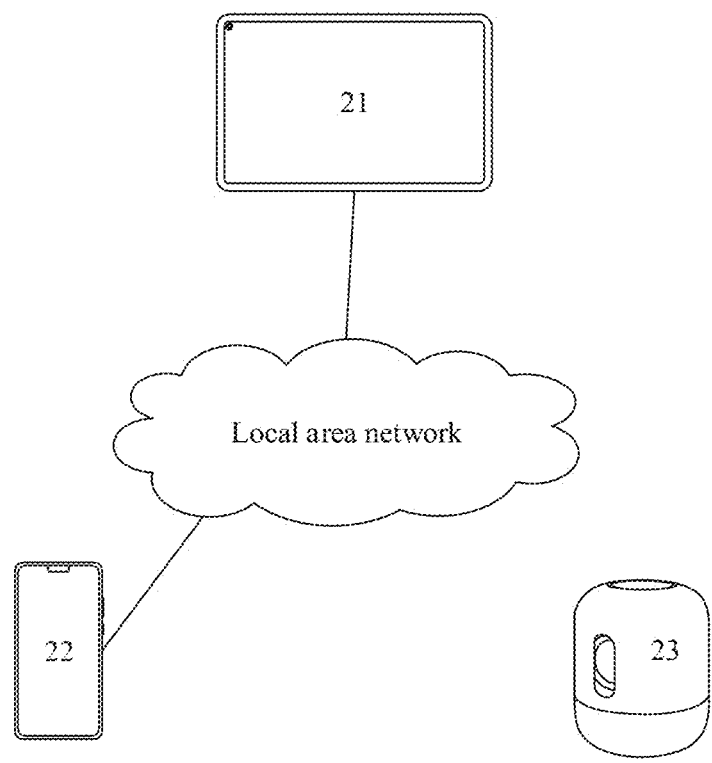
FIG. 5 is a diagram of a system architecture of another device registration system according to an embodiment of this application.

For example, as shown in FIG. 5, it is assumed that a device registration system includes a central control screen 21, a mobile phone 22, and a smart sound box 23.

In this example, the central control screen 21 may be understood as a hub device, the mobile phone 22 may be understood as user equipment, and the smart sound box 23 may be understood as an unregistered smart home device. In addition, the central control screen 21 and the mobile phone 22 are connected to a local area network in a home area, the mobile phone 22 logs in to the central control screen 21, and the smart sound box 23 is not connected to the local area network of the home area.

Figure 6:
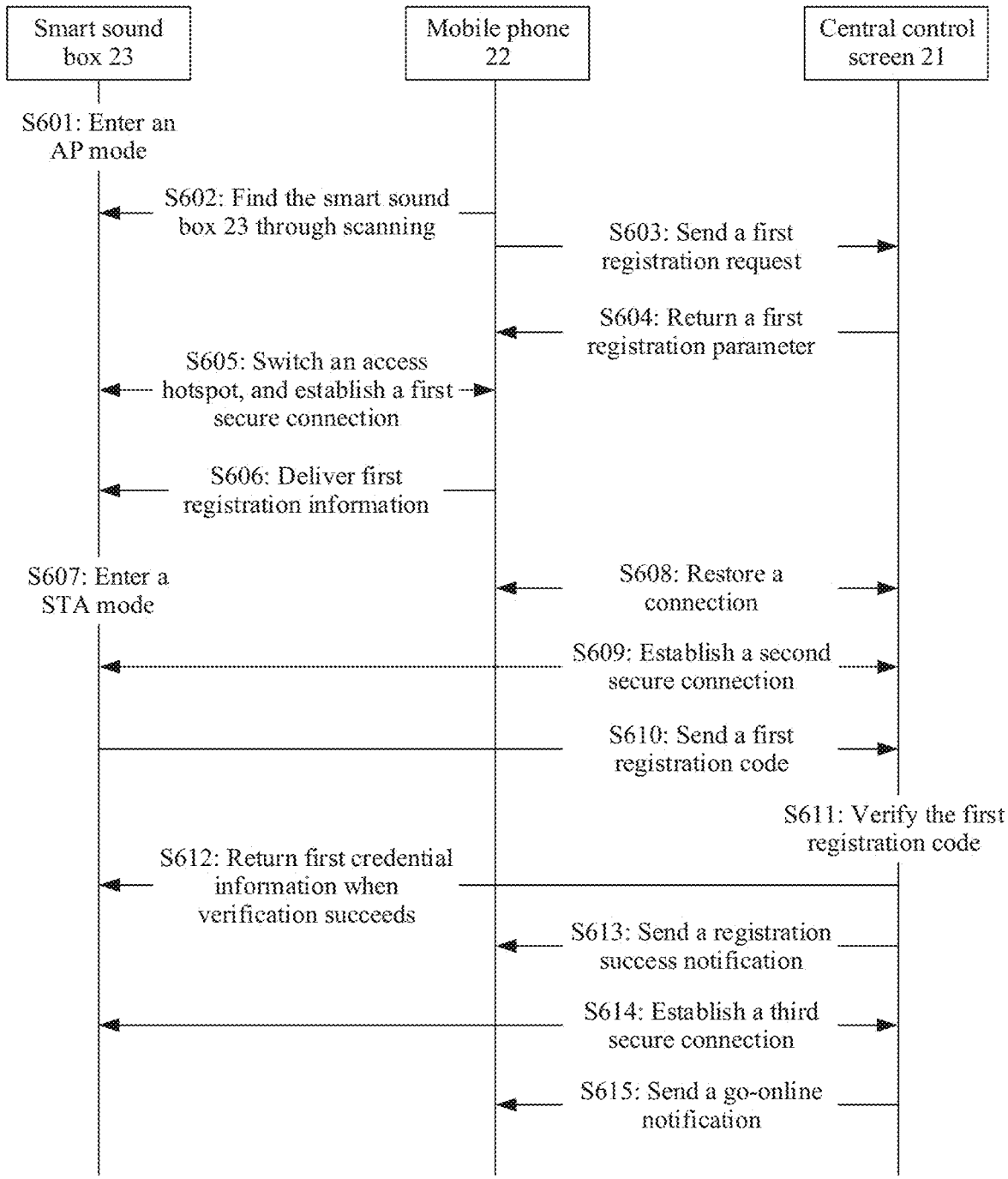
FIG. 6 is a device interaction diagram according to an embodiment of this application.

FIG. 6 shows an example of a device interaction diagram of an implementation in which the smart sound box 23 is registered with the central control screen 21 by using the mobile phone 22 in the scenario shown in FIG. 5.

Figure 7:
FIG. 7 is a schematic diagram of another scenario according to an embodiment of this application.

At a first moment, a user wants to register the smart sound box 23 with the central control screen 21. In this case, as shown in FIG. 7, the user may perform a preset operation on the smart sound box 23, for example, perform a press and hold on a volume button. The smart sound box 23 may enter an AP mode in response to the preset operation of the user, and share a hotspot externally, as shown in step S601 in FIG. 6.

Figure 8:
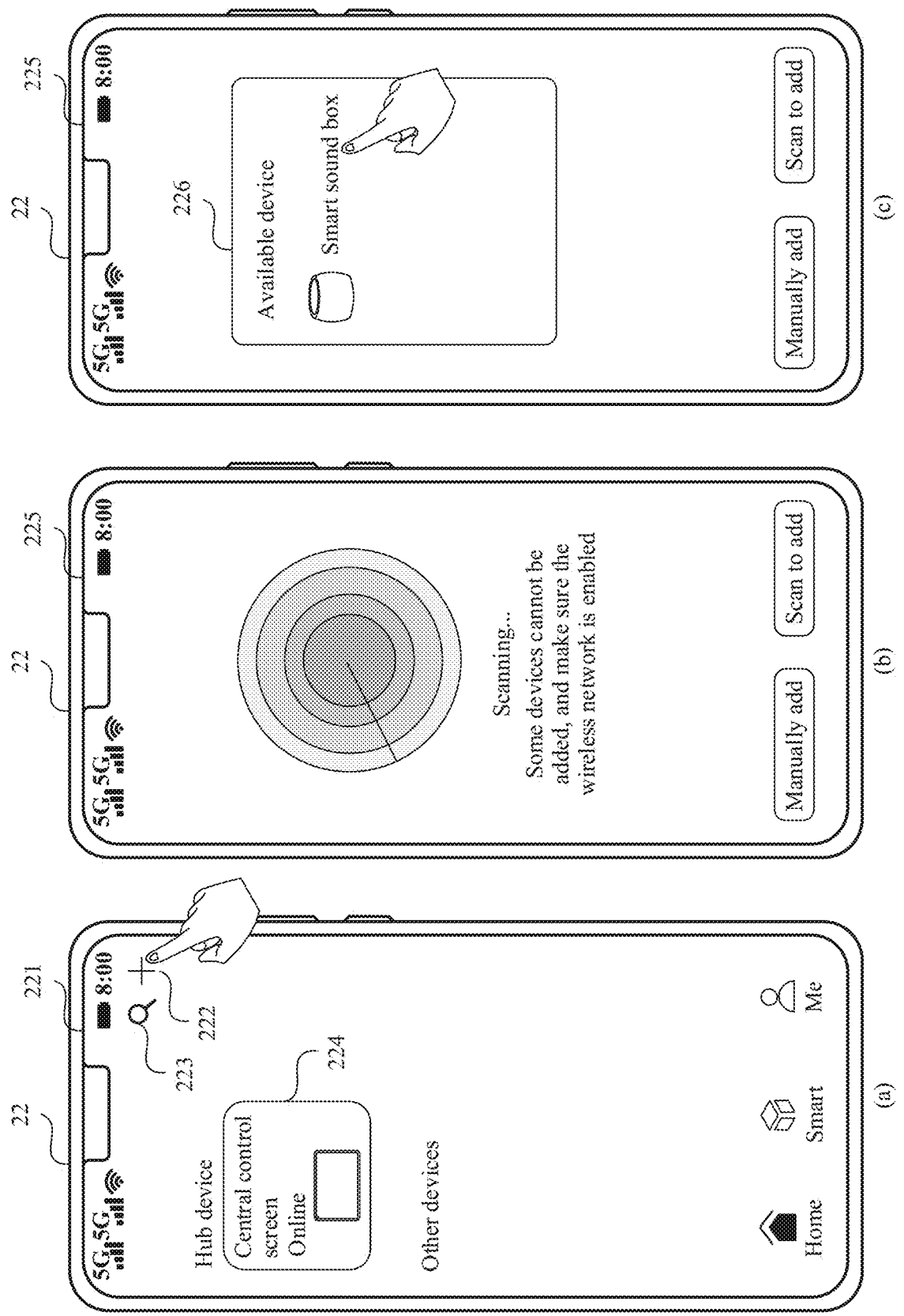
FIG. 8 is a schematic diagram of another scenario according to an embodiment of this application.

In some embodiments, as shown in (a) in FIG. 8, the user may further start smart home management software (for example, an installation and maintenance application) on the mobile phone 22, to enter a device management interface 221. The device management interface 221 may include an "Add" control 222, a "Search" control 223, and a control 224 for managing the central control screen 21.

In some embodiments, the mobile phone 22 logs in to the central control screen 21, and therefore, the control 224 may be displayed in the device management interface 221. In some other embodiments, the mobile phone 22 does not log in to the central control screen 21, and therefore, the control 224 may not be displayed in the device management interface 221.

The user may tap the "Add" control 222 in the device management interface 221. As shown in (b) in FIG. 8, the mobile phone 22 may enter a scanning interface 225 in response to an operation of the user, and perform a scanning operation to scan for an ambient electronic device that is in the AP mode (that is, share the hotspot).

In a scanning process, the mobile phone 22 discovers the hotspot shared by the smart sound box 23, that is, the mobile phone 22 finds the smart sound box 23 through scanning, as shown in step S602 in FIG. 6. Therefore, as shown in (c) in FIG. 8, the mobile phone 22 may display a device list 226, and display a "Smart sound box" option in the device list 226.

Figure 9:
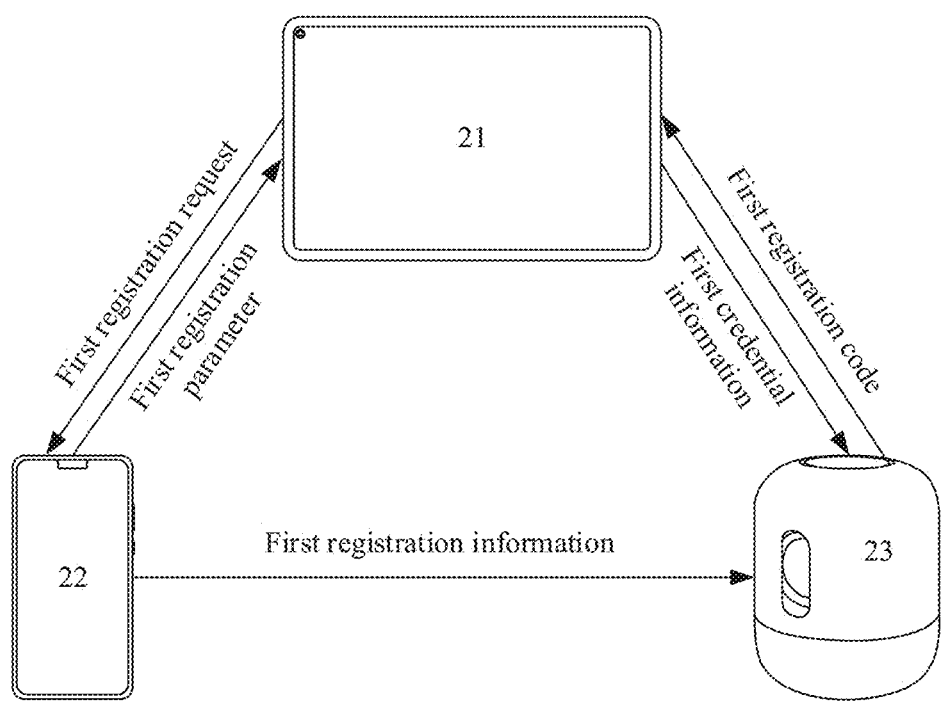
FIG. 9 is a schematic diagram of another scenario according to an embodiment of this application.

After viewing the device list 226, the user may tap the "Smart sound box" option. In this case, as shown in FIG. 9, the mobile phone 22 may determine the smart sound box 23 as a target device in response to the operation of the user, and send a first registration request to the central control screen 21, as shown in step S603 in FIG. 6.

After receiving the first registration request, the central control screen 21 may generate a first registration parameter, and return the first registration parameter to the mobile phone 22, as shown in step S604 in FIG. 6. Optionally, the central control screen 21 may further set a timer.

In some embodiments, the first registration parameter may include a first registration code, and the first registration code is used by the central control screen 21 to verify the smart sound box 23. Optionally, the first registration parameter may further include a first device identifier, and the first device identifier may be used as an identity of the smart sound box 23 after registration succeeds.

Timing duration of the timer is valid duration of the first registration parameter, and the timing duration may be set based on an actual requirement. For example, in this example, the timing duration may be set to 5 minutes (min). In this case, the first registration parameter is valid within 5 minutes, and the first registration parameter expires after 5 minutes. A time point at which the timer starts timing may be a time point at which the central control screen 21 generates the first registration parameter, or may be a time point at which the central control screen 21 sends the first registration parameter to the mobile phone 22, or may be another time point. This is not limited in this embodiment of this application.

After receiving the first registration parameter, the mobile phone 22 may disconnect from the local area network, access the hotspot shared by the smart sound box 23, and deliver first registration information to the smart sound box 23.

In some embodiments, the first registration information may include the first registration parameter and the identifier of the central control screen 21. The identifier of the central control screen 21 is used to search for the central control screen 21. The identifier of the central control screen 21 may include one or more of identifiers such as a local area network IP address of the central control screen 21, a MAC address of the central control screen 21, and an SN code of the central control screen 21. In this example, the identifier of the central control screen 21 may include the local area network IP address of the central control screen 21.

Optionally, the first registration parameter may further include local area network connection information of the foregoing local area network. The local area network connection information may include an SSID and a connection password of the local area network.

In some embodiments, because the first registration information is sensitive, to prevent malicious listening by another person and improve communication security, the mobile phone 22 may negotiate a first session key with the smart sound box 23 before transmitting the first registration information, and establish a first secure connection by using a first session key. The mobile phone 22 may send the first registration information to the smart sound box 23 through the first secure connection, as shown in step S605 and step S606 in FIG. 6.

A manner of generating the session key may be determined based on an actual requirement. For example, the manner of generating the session key may include any one or more of encryption algorithms such as an RSA encryption algorithm, an Elliptic curve cryptography (Elliptic curve cryptography, ECC) algorithm, and a key exchange (Diffie-Hellman Key Exchange, DH) algorithm. A specific manner of generating the session key is not limited in this embodiment of this application.

After receiving the first registration information, the smart sound box 23 may stop sharing the hotspot, and enter a station (Station, STA) mode, as shown in step S607 in FIG. 6. The mobile phone 22 may re-access the local area network, and restore the connection with the hub device, as shown in step S608 in FIG. 6.

After entering the STA mode, the smart sound box 23 may access the local area network based on the local area network connection information, and access the central control screen 21 based on the local area network IP address.

In some embodiments, for communication security, the smart sound box 23 may negotiate a second session key with the central control screen 21 by using a first registration code, and establish a second secure connection, as shown in step S609 in FIG. 6.

The smart sound box 23 may send the first registration code to the central control screen 21 through the second secure connection, as shown in step S610 in FIG. 6.

After the central control screen 21 receives the first registration code sent by the smart sound box 23, the central control screen 21 may verify the received first registration code with the first registration code delivered by the central control screen 21 in step S604, as shown in step S611 in FIG. 6. The verification may include: determining, by the central control screen 21, whether the first registration code received by the central control screen 21 in step S610 is the same as the first registration code generated by the central control screen 21 in step S604. According to the foregoing verification process, it can be ensured that the smart home device registered with the central control screen 21 is the target device that the user wants to register, to avoid malicious registration of another electronic device and improve security of device registration.

In some embodiments, if a timer corresponding to the first registration code is set by the central control screen 21, after receiving the first registration code in step S610, the central control screen 21 first determines, based on the timer, whether the first registration code is valid, and then verifies the first registration code when determining that the first registration code is valid. Certainly, a process of determining whether the first registration code is valid may also be understood as a part of the foregoing "verification" process. It takes specific time to crack the first verification code. Therefore, whether the first registration code is valid is determined based on the timer, so that a possibility that another person maliciously cracks and uses the first registration code can be reduced. In this way, security of device registration is improved.

When the first registration code received by the central control screen 21 in step S610 is the same as the first registration code generated by the central control screen 21 in step S604, it indicates that verification succeeds. Then the central control screen 21 may generate first credential information, and return the first credential information to the smart sound box 23, as shown in step S612 in FIG. 6.

Figure 10:
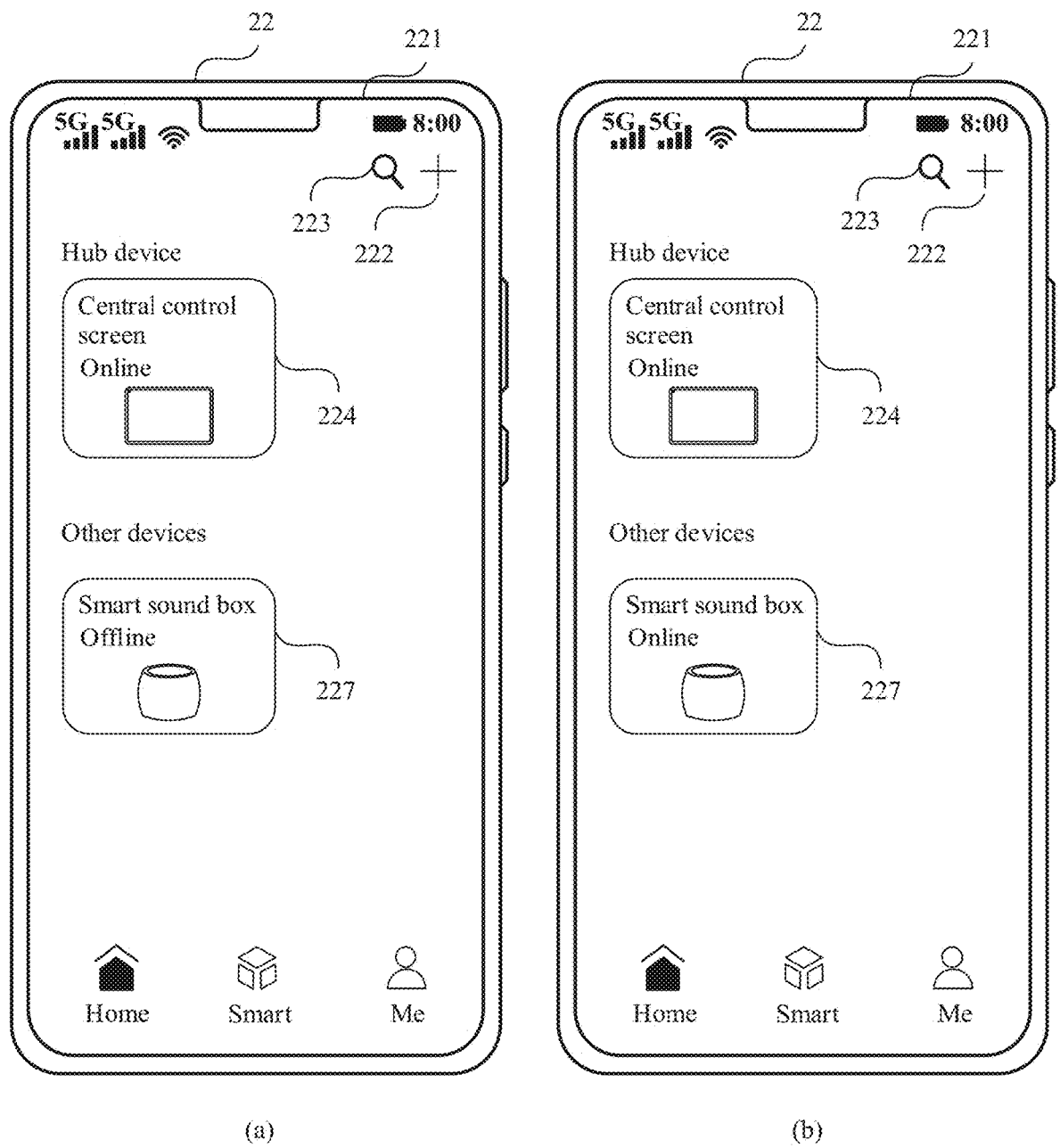
FIG. 10 is a schematic diagram of another scenario according to an embodiment of this application.

In some embodiments, the central control screen 21 may further send a registration success notification to the mobile phone 22, as shown in step S613 in FIG. 6. In some embodiments, as shown in (a) in FIG. 10, after receiving the registration success notification, the mobile phone 22 may add, to the device management interface 221, a control 227 for managing the smart sound box 23, and display, on the control 227, that a status of the smart sound box 23 is an offline state. In some embodiments, when the smart sound box 23 is in the offline state, the user cannot control the smart sound box 23 by using the mobile phone 22, and the mobile phone 22 cannot obtain device status information of the smart sound box 23, for example, a battery level and a volume of the smart sound box 23.

In some embodiments, after receiving the first credential information, the smart sound box 23 may negotiate a third session key with the central control screen 21 based on the first credential information, and establish a third secure connection, as shown in step S614 in FIG. 6. In this way, the smart sound box 23 completes a process of registering with the central control screen 21.

In some embodiments, the central control screen 21 may send a go-online notification to the mobile phone 22 after establishing the third secure connection, as shown in step S615 in FIG. 6. When the mobile phone 22 receives the go-online notification, as shown in (b) in FIG. 10, the mobile phone 22 may change a status of the smart sound box 23 in the control 227 to an online state. In some embodiments, when the smart sound box 23 is in the online state, the user can control the smart sound box 23 and view the device status information of the smart sound box 23 by using the mobile phone 22.

It may be understood that, in the implementation shown in FIG. 6, not all steps are mandatory, and some steps may be omitted or replaced with other steps. For example, steps S613 and S615 are optional steps, and step S605 may be replaced with establishment of an unencrypted connection or the like.

In addition, sequence numbers of the steps shown in FIG. 6 do not mean execution sequences, and the execution sequences of the steps should be determined based on functions and internal logic of the steps. For example, a sequence of performing step S607 and step S608 is not limited. Step S607 may be performed before step S608, or step S607 may be performed after step S608.

It can be learned from the foregoing example that, when the local area network cannot be connected to the Internet, although the user equipment cannot register the target device with a specified user account, the user equipment may use the hub device in the local area network as an edge server and register the target device with the hub device.

In this case, the hub device is equivalent to an anonymous account not associated with any user, and the user may perform coordinated control on each registered device (that is, a target device that is registered with the hub device) with the hub device. In this case, user experience can be effectively improved.

In an installation scenario, before a house is delivered, various smart home devices in the house cannot connect to the Internet or communicate with a smart home platform on a cloud. A field engineer does not know a user account of a future household. In this case, by using the device registration method provided in this embodiment of this application, the field engineer may use an installation and maintenance device (for example, a mobile phone of the field engineer) to register various smart home devices (for example, a light, a smart lock, a smart curtain, and an alarm) in the house with a hub device. In this way, the field engineer can install, configure, and perform coordinated management on the smart home devices by operating the hub device or the installation and maintenance device. For example, the field engineer configures a location label "living room" and a device capability label "lighting" for a light installed in a living room. For another example, the field engineer configures some initialization scenarios and device linkage. For example, an alarm is enabled in an "Out" mode, a smart lock enters an alert state, a main light in a living room is disabled when a "Theater" mode is on, and an auxiliary light in the living room is enabled in low illumination.

After the house is delivered, the household may directly perform coordinated management on the foregoing smart home devices and use the foregoing configuration content, and does not need to perform the foregoing registration and configuration processes.

4. Device Control.

When the user wants to control the registration device, the user may directly control the registered device with the hub device; or the user may indirectly control the registered device on the user equipment by using a relay function of the hub device after the user equipment logs in to the hub device.

Specifically, in some embodiments, the user may directly perform a control operation on the hub device.

In this case, the hub device may determine a controlled device and a control instruction in response to the control operation of the user. The controlled device refers to a registered device that the user wants to control, or may be understood as a registered device selected by the user. The control instruction indicates an operation that the user wants to perform, or may be understood as an operation selected by the user.

Then, the hub device may send the control instruction to the controlled device.

When the controlled device receives the control instruction, the controlled device may perform an operation corresponding to the control instruction.

Optionally, after executing the operation corresponding to the control instruction, the controlled device may further return an execution result to the hub device.

After receiving the execution result, the hub device may display the execution result, so that the user knows an execution process.

Figure 11:
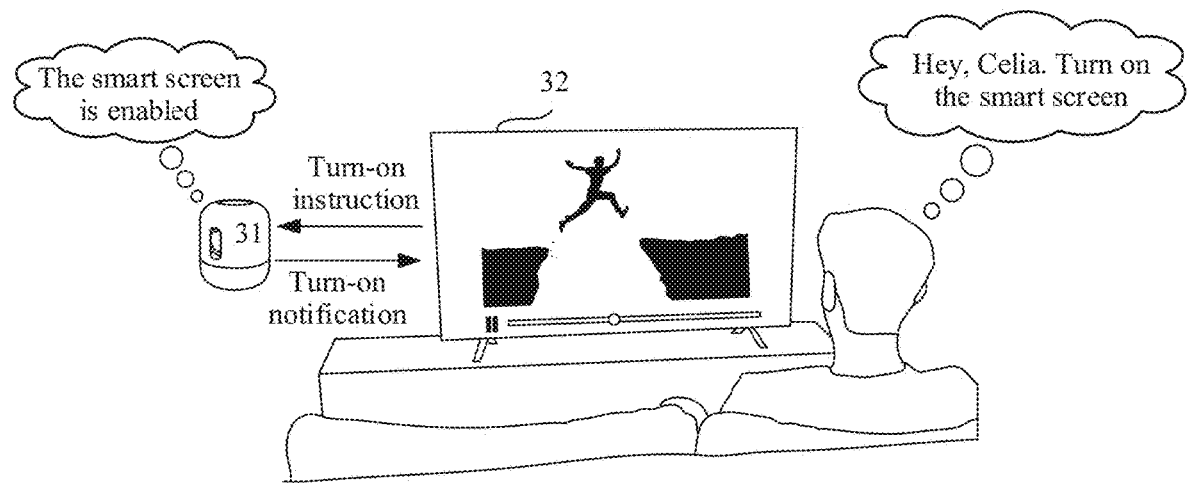
FIG. 11 is a schematic diagram of another scenario according to an embodiment of this application.

For example, as shown in FIG. 11, in this example, a smart sound box 31 may be understood as a hub device, and a smart screen 32 may be understood as a registered device.

After returning home at night, a user wants to turn on the smart screen 32 to watch a program. In this case, the user may perform a control operation on the smart sound box. For example, the user may say, to the smart sound box 31. "Hey, Celia. Turn on the smart screen".

The smart sound box 31 may receive a human voice signal sent by the user, and identify the human voice signal, to determine that the controlled device is the smart screen 32, and the control instruction is a turn-on instruction. After the controlled device and the control instruction are determined, the smart sound box 31 may send the turn-on instruction to the smart screen 32.

When the smart screen 32 receives the turn-on instruction, the smart screen 32 may enter a working state and play a program.

In some embodiments, the smart screen 32 may return a turn-on notification to the smart sound box 31 after entering the working state.

In some embodiments, when the smart sound box 31 receives the turn-on notification, the smart sound box 31 may announce "The smart screen is turned on".

It can be learned from the foregoing example that, because the registered device is registered with the hub device, when the user wants to control the registered device, the user may directly perform a control operation on the hub device.

In this case, the hub device may determine the controlled device and the control instruction based on the control operation of the user, and control the controlled device to perform an operation corresponding to the control instruction.

In addition, because the hub device establishes a connection with the registered device, the user does not need to repeatedly perform a connection operation in a process of operating the central device, so that operation steps of the user can be effectively reduced, and use experience of the user can be improved.

In some other embodiments, the user may alternatively perform a control operation on the user equipment after the user equipment logs in to the hub device.

In this case, the user equipment may determine the controlled device and the control instruction in response to the control operation, and send control information to the hub device, where the control information may include the control instruction and a first device identifier corresponding to the controlled device.

After receiving the control information, the hub device may determine the controlled device based on the first device identifier corresponding to the controlled device, and forward the control instruction to the controlled device.

When the controlled device receives the control instruction, the controlled device may perform an operation corresponding to the control instruction.

Optionally, after executing the operation corresponding to the control instruction, the controlled device may return an execution result to the hub device.

After receiving the execution result, the hub device may forward the execution result to the user equipment.

After receiving the execution result, the user equipment may display the execution result, so that the user knows an execution process.

Figure 12:
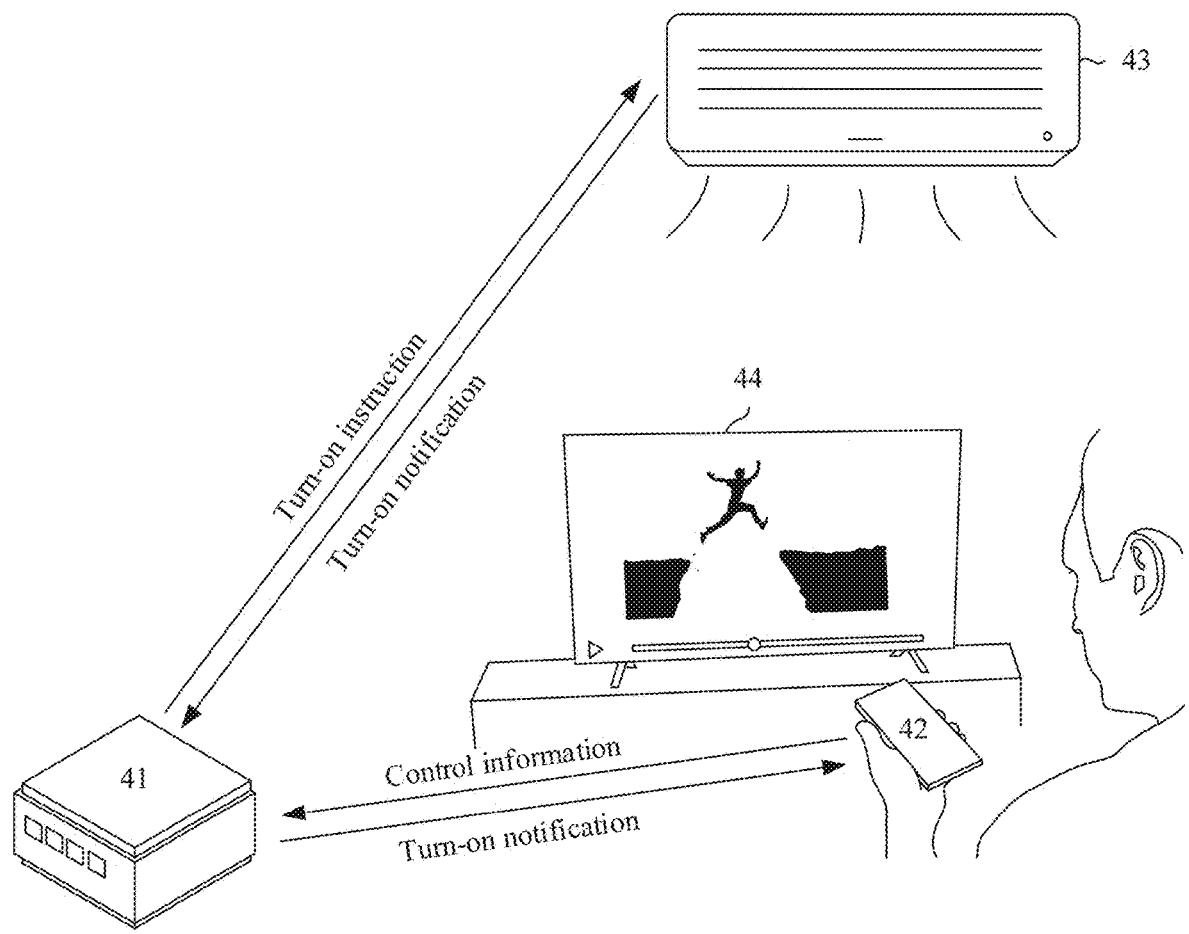
FIG. 12 is a schematic diagram of another scenario according to an embodiment of this application.

For example, as shown in FIG. 12, in this example, a home host 41 may be understood as a hub device, a mobile phone 42 may be understood as user equipment, and a smart air conditioner 43 and a smart screen 44 may be understood as registered devices.

In some embodiments, after a user returns home at night, the mobile phone 42 may automatically access a local area network based on historical local area network connection information.

Then, the user opens smart home management software (for example, an installation and maintenance application). In some embodiments, after starting the smart home management software, the mobile phone 42 may automatically log in to the home host 41 based on an administrator account and an administrator password that are recorded in a historical record.

Figure 13:
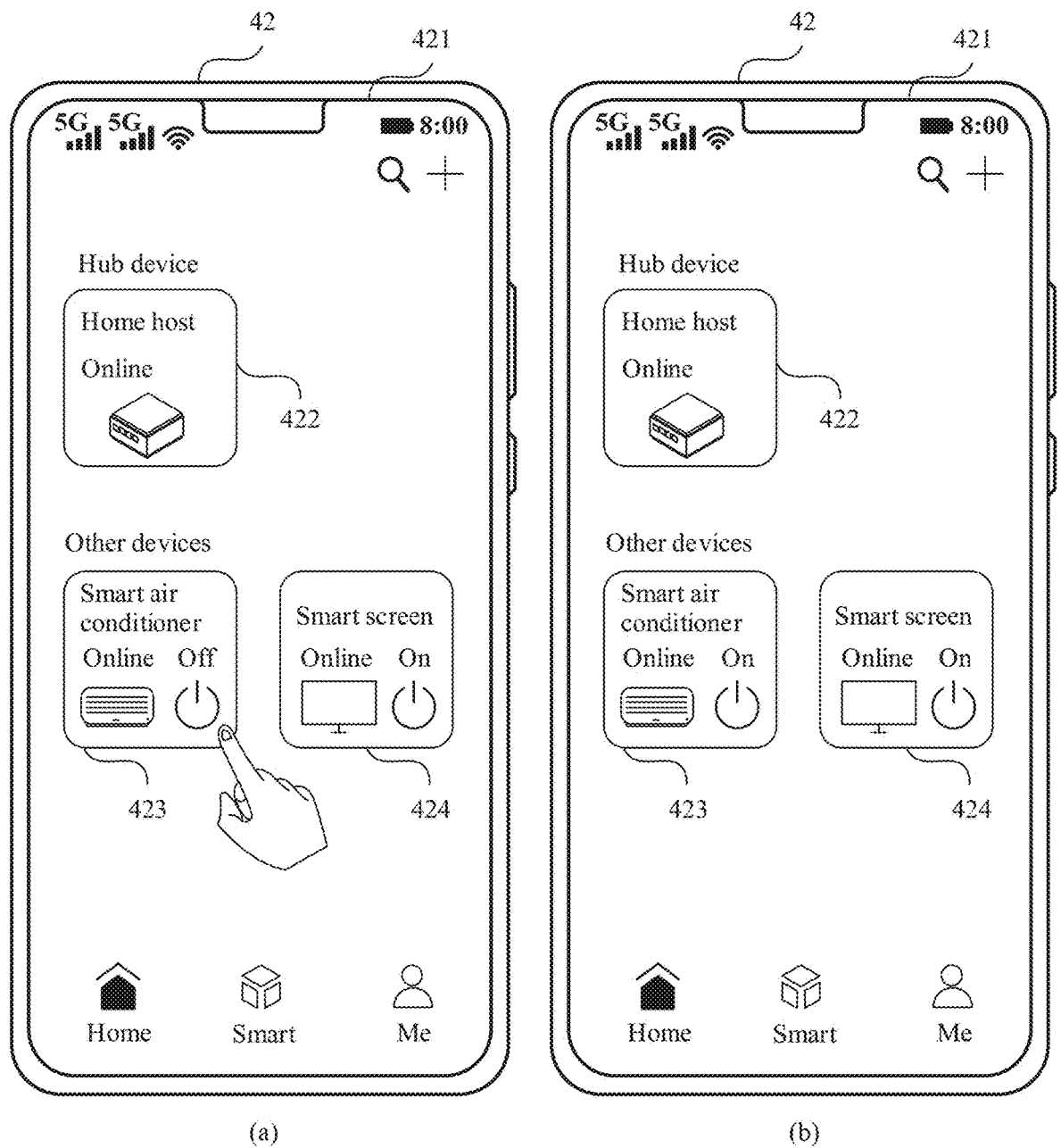
FIG. 13 is a schematic diagram of another scenario according to an embodiment of this application.

In this case, as shown in (a) in FIG. 13, the mobile phone 42 may display a device management interface 421 to the user. The device management interface 421 may include a control 422 for managing the home host 41, a control 423 for managing the smart air conditioner 43, and a control 424 for managing the smart screen 44.

When the user taps the control 423, the mobile phone 42 may determine, in response to an operation of the user, that the controlled device is the smart air conditioner 43. In addition, because the smart air conditioner 43 is in an off state, the mobile phone 42 may determine that the control instruction is a turn-on instruction.

After determining the controlled device and the control instruction, the mobile phone 42 may send control information to the home host 41. The control information includes a first device identifier and a turn-on instruction that correspond to the smart air conditioner 43.

When the home host 41 receives the control information, the home host 41 may determine, based on the first device identifier in the control information, that the smart air conditioner 43 is the controlled device. In this case, the home host 41 may forward the turn-on instruction in the control information to the smart air conditioner 43.

After the smart air conditioner 43 receives the turn-on instruction, the smart air conditioner 43 may enter an on state.

In some embodiments, the smart air conditioner 43 may return a turn-on notification to the home host 41 after entering the on state.

After the home host 41 receives the turn-on notification, the home host 41 may forward the turn-on notification to the mobile phone 42.

In some embodiments, when the mobile phone 42 receives the turn-on notification, as shown in (b) in FIG. 13, the mobile phone may change a device status of the smart air conditioner 43 in the control 423 to the on state.

It can be learned from the foregoing example that, when the user wants to control the registered device, the user may alternatively enable the user equipment to log in to the hub device, to obtain an operation permission of the registered device.

Then, the user equipment may determine the controlled device and the control instruction based on the control operation of the user, and control, by using a relay function of the hub device, the controlled device to perform an operation corresponding to the control instruction.

In the foregoing control manner, to control every registered device, the user equipment only needs to log in to the hub device, and does not need to separately establish a connection with each registered device. This can effectively reduce operation steps of the user and improve user experience.

For example, in an installation scenario, before the house is delivered, the field engineer may use the installation and maintenance device to log in to the hub device, and obtain an operation permission of each registered device. Then, by using the installation and maintenance device or the hub device, the field engineer may control each registered device, debug performance of each registered device, and configure information about each registered device. When the house is delivered, before the household enables a home Internet cable, the household may log in to the hub device by using a personal device of the household (for example, a mobile phone of the household), and obtain the operation permission of each registered device. Then, the household may perform coordinated management on all registered devices by using the personal device or the hub device of the household.

5. Proxy Registration.

When the routing device is connected to the Internet cable, an electronic device in the local area network may access the Internet through the routing device.

In this case, the user may perform a device delivery operation on the user equipment, and register the hub device and the registered device with the smart home platform.

The foregoing device delivery operation may be understood as an operation of registering house-wide smart home devices with the user account of the household after the house is delivered.

Specifically, when the user equipment detects a device delivery operation of the user, the user equipment may perform a multicast operation in a local area network, to scan an unregistered electronic device.

A specific form of the foregoing device delivery operation may be set based on an actual requirement. For example, in some embodiments, the device delivery operation may be starting a specific application (Application, APP) by the user equipment. In some other embodiments, the device delivery operation may be scanning a specific two-dimensional code and reading specific device information from the two-dimensional code by the user equipment. In some other embodiments, the device delivery operation may be contacting with an NFC tag of a specific device and reading specific device information from the NFC tag by the user equipment. In some other embodiments, the foregoing device delivery operation may also be represented in another form. A specific form of the foregoing device delivery operation is not limited in this embodiment of this application.

In the multicast scanning process of the user equipment, because the registered device is registered with the hub device, the registered device may not respond to the multicast operation of the user equipment.

The hub device and an unregistered smart home device (collectively referred to as a to-be-registered device below) are not registered. Therefore, the to-be-registered device may send device information of the device to the user equipment in response to the multicast scanning operation of the user equipment.

Content of the foregoing device information may be set based on an actual requirement. For example, the foregoing device information may include one or more of information such as a product identification (Product identification, prodId) code, an SN code, and a MAC address.

After receiving the device information of the to-be-registered device, the user equipment may determine the to-be-registered device based on the device information, send a second registration request to the smart home platform, and receive a second registration parameter returned by the smart home platform. The second registration parameter may include a second registration code.

Optionally, the second registration parameter may further include a second device identifier. After the to-be-registered device is registered, the second device identifier may be used as an identity of the to-be-registered device.

One to-be-registered device corresponds to one second device identifier and one second registration code.

Then, the user equipment may deliver the second registration parameter and a platform identifier of the smart home platform to each to-be-registered device. The platform identifier is used to search for the smart home platform, and content included in the platform identifier may be set based on an actual requirement. For example, in some embodiments, the platform identifier may include a uniform resource locator (Uniform Resource Locator, URL) of the smart home platform.

When the to-be-registered device receives the second registration parameter and the platform identifier, the to-be-registered device may access the smart home platform based on the platform identifier, and send the second registration code to the smart home platform.

When the smart home platform receives the second registration code, the smart home platform may verify the received second registration code based on a delivered second registration code.

If the delivered second registration code is consistent with the received second registration code, it indicates that the verification succeeds. The smart home platform may bind the foregoing to-be-registered device to a currently logged-in first user account of the user equipment, and send second credential information to the to-be-registered device, to complete the registration procedure.

If the delivered second registration code is inconsistent with the received second registration code, it indicates that the verification fails, and the smart home platform may refuse to register the to-be-registered device.

In some embodiments, after the hub device registers with the smart home platform, the hub device may further send a third registration request to the smart home platform, to register the foregoing registered device with the smart home platform.

After receiving the third registration request, the smart home platform may bind the registered device to the first user account, and deliver, to the hub device, a third device identifier and third credential information that correspond to the registered device. One registered device corresponds to one third device identifier and one piece of third credential information.

After receiving the third device identifier and the third credential information that correspond to the registered device, the hub device may deliver the third device identifier and the third credential information to the corresponding registered device, and update the locally stored first device identifier and first credential information with the third device identifier and the third credential information.

When the registered device receives the third device identifier and the third credential information, the registered device may update the locally stored first device identifier and first credential information with the third device identifier and the third credential information.

Figure 14:
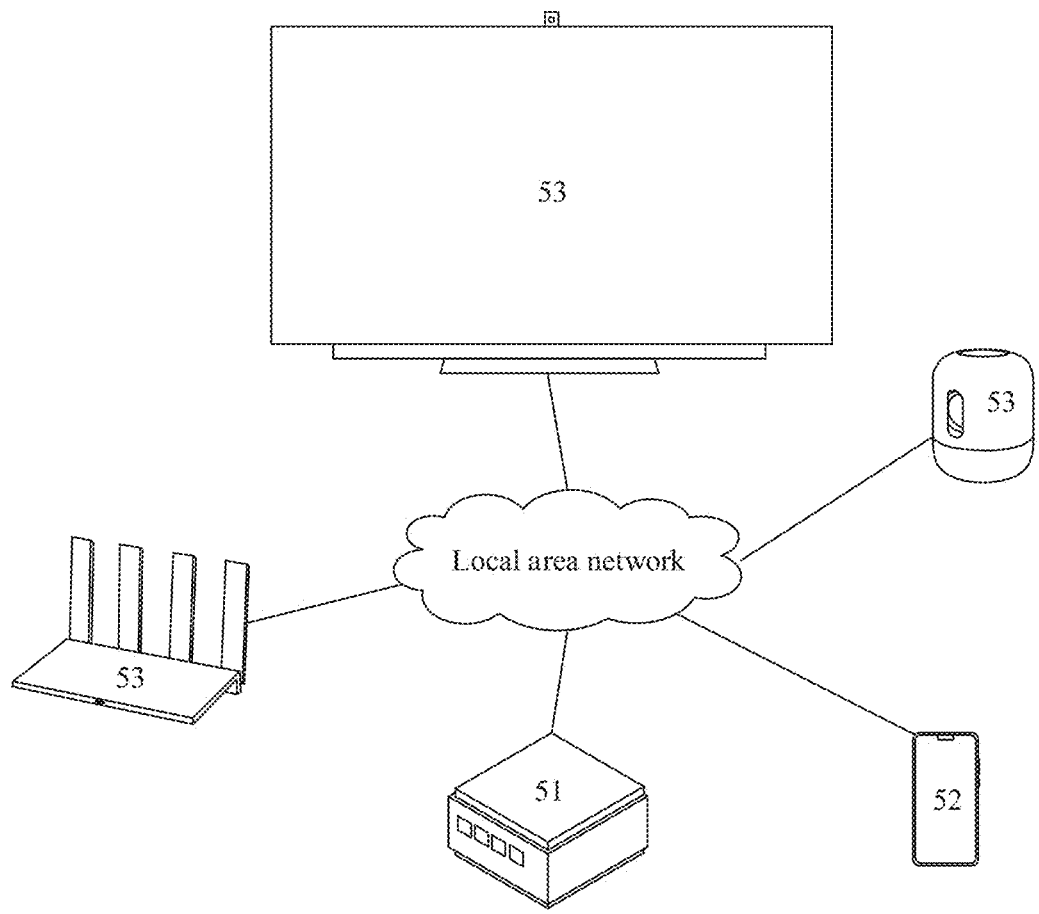
FIG. 14 is a diagram of a system architecture of another device registration system according to an embodiment of this application.

For example, as shown in FIG. 14, it is assumed that a device registration system includes a home host 51, a mobile phone 52, and a smart home device 53.

In this example, the home host 51 may be understood as a hub device, and the mobile phone 52 may be understood as user equipment. Both the home host 51 and the mobile phone 52 are configured with a near field communication (Near Field Communication, NFC) function. The mobile phone 52 and the home host 51 are located in a same local area network. The smart home device 53 in the local area network is registered with the home host 51.

Figure 15:
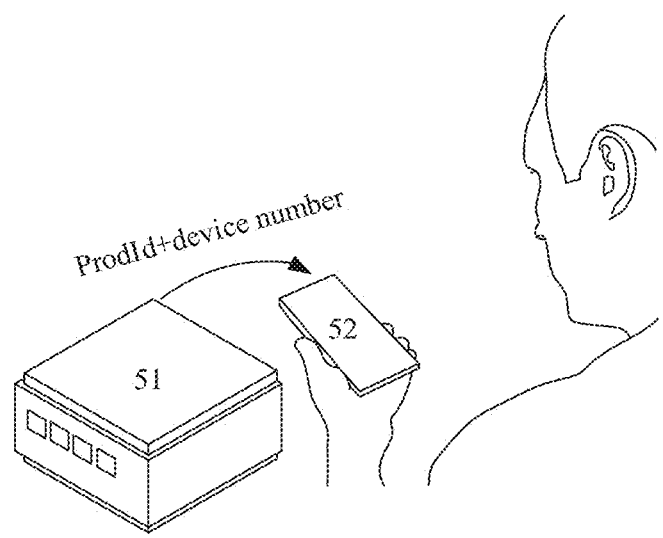
FIG. 15 is a schematic diagram of another scenario according to an embodiment of this application.

After a routing device is connected to an Internet cable, the foregoing local area network may access the Internet. As shown in FIG. 15, if a user wants to register the home host 51 and the smart home device 53 with a first user account, the user may perform a device delivery operation on the mobile phone 52, for example, use the mobile phone 52 touch an NFC tag of the home host 51. The first user account is a currently logged-in user account of the mobile phone 52.

In a process of contacting with the home host 51 by the mobile phone 52, the home host 51 and the mobile phone 52 may discover each other, and establish an NFC connection.

In some embodiments, the home host 51 may send a product identification (product identification, prodId) code and a device number to the mobile phone 52 through the NFC connection. In some embodiments, the device number may be formed by an SN code and/or a MAC address of the home host 51.

After receiving the prodId and the device number, the mobile phone 52 may identify a device type corresponding to the prodId.

In some embodiments, when the mobile phone 52 identifies that the device type corresponding to the prodId is "home host", the mobile phone 52 may detect, based on the device number, whether the home host 51 is registered with the first user account.

Specifically, the prodId may be code used to identify a product model of an electronic device. Therefore, the mobile phone 52 learns, through query based on the obtained prodId, that the device type is "home host". A procedure of registering a device of the "home host" type is preconfigured in the mobile phone 52. Therefore, the mobile phone 52 may execute the registration procedure in response to obtaining the prodId of the home host 51. In the registration process, the mobile phone 52 may first detect, based on the device number of the home host 51, whether the home host is registered with the first user account.

If the home host 51 is registered with the first user account, the mobile phone 52 may directly open a house-wide control interface corresponding to the home host 51.

If the home host 51 is not registered with the first user account, the mobile phone 52 may enter a house delivery procedure.

It is assumed that the home host 51 is not registered. In this case, the mobile phone 52 detects that the home host 51 is not registered with the first user account, and the mobile phone 52 may enter the house delivery procedure.

Figure 16:
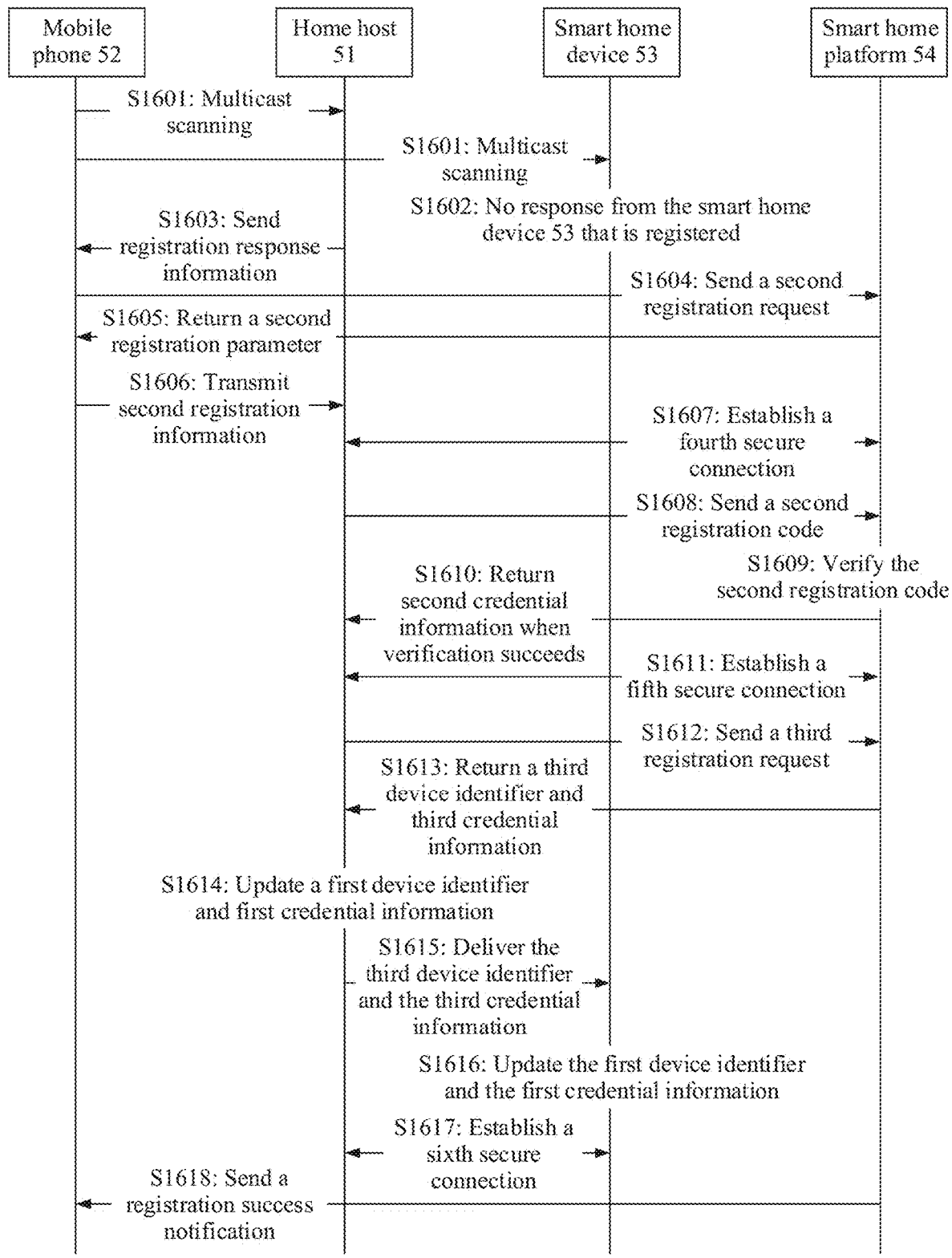
FIG. 16 is another device interaction diagram according to an embodiment of this application.

FIG. 16 shows an example of a device interaction diagram of an implementation in which a home host 51 and a smart home device 53 are registered with a smart home platform 54 on a cloud by using a mobile phone 52 in a scenario shown in FIG. 14.

In a house delivery procedure, the mobile phone 52 may perform multicast scanning, in a local area network, to obtain an unregistered electronic device as shown in step S1601 in FIG. 16.

Because the smart home device 53 is registered with the home host 51, the smart home device 53 may not respond to the multicast operation of the mobile phone 52, as shown in step S1602 in FIG. 16.

Because the home host 51 is not registered, the home host 51 may send registration response information to the mobile phone 52, as shown in step S1603 in FIG. 16. In some embodiments, the registration response information may include device information of the home host 51.

After receiving the registration response information, the mobile phone 52 may determine, based on the device information of the home host 51, that the home host 51 is a to-be-registered device. Then, the mobile phone 52 may send a second registration request to the smart home platform 54, as shown in step S1604 in FIG. 16.

After receiving the second registration request, the smart home platform 54 may generate a second registration parameter, and return the second registration parameter to the mobile phone 52, as shown in step S1605 in FIG. 16. In some embodiments, the second registration parameter may include a second registration code.

Optionally, the second registration parameter may further include a second device identifier. After the home host 51 is registered, the second device identifier may be used as an identity of the home host 51.

After receiving the second registration parameter, the mobile phone 52 may transmit second registration information to the home host 51, as shown in step S1606 in FIG. 16.

The second registration information may include the second registration parameter and a platform identifier of the smart home platform 54. In some embodiments, the platform identifier of the smart home platform 54 may include a URL of the smart home platform 54.

After receiving the second registration information, the home host 51 may access the smart home platform 54 based on the second registration information (for example, the foregoing URL).

In some embodiments, to improve communication security, the home host 51 may negotiate a fourth session key with the smart home platform 54 based on the second registration code, and establish a fourth secure connection, as shown in step S1607 in FIG. 16.

Then, the home host 51 may send the second registration code to the smart home platform 54 through the fourth secure connection, as shown in step S1608 in FIG. 16.

After receiving the second registration code sent by the home host 51, the smart home platform 54 may verify the received second registration code based on a delivered second registration code, as shown in step S1609 in FIG. 16. The verification may include: determining, by the smart home platform 54, whether the second registration code received by the smart home platform 54 in step S1608 is the same as the second registration code generated by the smart home platform 54 in step S1605. According to the foregoing verification procedure, it can be ensured that an electronic device registered with the smart home platform 54 is the home host 51, and malicious registration by another electronic device can be avoided. In this way, security of device registration can be improved.

When the second registration code received by the smart home platform 54 in step S1608 is the same as the second registration code generated by the smart home platform 54 in step S1605, it indicates that the verification succeeds. The smart home platform 54 may bind the home host 51 to the first user account, and deliver second credential information to the home host 51, as shown in step S1610 in FIG. 16.

A process of registering the home host 51 with the smart home platform 54 may be completed by performing step S1601 to step S1610. Next, a process of registering the smart home device 53 with the smart home platform 54 is implemented.

In some embodiments, after receiving the second credential information, the home host 51 may negotiate a fifth session key with the smart home platform 54 based on the second credential information, and establish a fifth secure connection, as shown in step S1611 in FIG. 16.

In some embodiments, the home host 51 may further send a third registration request to the smart home platform 54, where the third registration request is used to register the smart home device 53, as shown in step S1612 in FIG. 16.

Content included in the third registration request may be set based on an actual requirement. In some embodiments, the third registration request may include quantity information of the smart home devices 53. For example, it is assumed that three smart home devices 53 need to be registered. In this case, the home host 51 may add quantity information to the third registration request, and set the data information to 3. After the smart home platform 54 receives the third registration request, the smart home platform 54 may determine, based on the quantity information in the third registration request, that three smart home devices 53 need to be registered.

In some other embodiments, the third registration request may also include device information of the smart home device 53, and the device information may include one or more of pieces of information such as a prodId, an SN code, and a MAC address. For example, it is assumed that three smart home devices 53 need to be registered. In this case, the home host 51 may add device information of the three smart home devices 53 to the third registration request. After the smart home platform 54 receives the third registration request, the smart home platform 54 may determine, based on the device information in the third registration request, that three smart home devices 53 need to be registered.

In some other embodiments, the third registration request may also include other information. Content included in the third registration request is not limited in this embodiment of this application.

In some embodiments, the home host 51 may send the third registration request to the smart home platform 54 through the fifth secure connection.

When the smart home platform 54 receives the third registration request, the smart home platform 54 may bind the smart home device 53 to the first user account, and return a third device identifier and third credential information to the home host 51, as shown in step S1613 in FIG. 16.

One smart home device 53 corresponds to one third device identifier and one piece of third credential information.

That the smart home platform 54 binds the smart home device 53 to the first user account may mean that the smart home device 54 associates, with the first user account, the third device identifier and the third credential information that correspond to the smart home device 53.

After receiving the third device identifier and the third credential information, the home host 51 may update, by using the third device identifier and the third credential information, the first device identifier and the first credential information that correspond to the smart home device 53, and deliver the corresponding third device identifier and the corresponding third credential information to each smart home device 53, as shown in step S1614 and step S1615 in FIG. 16.

The update may refer to: changing, by the home host 51, a locally recorded device identifier corresponding to the smart home device 53 from the first device identifier to the third device identifier, and changing locally recorded credential information corresponding to the smart home device 53 from the first credential information to the third credential information.

In some embodiments, before updating the first device identifier and the first credential information that correspond to the smart home device 53, the home host 51 may further back up the first device identifier and the first credential information as a rollback file. Based on the rollback file, the home host 51 may roll back, as required, the device identifier and the credential information that correspond to the smart home device 53 to the first device identifier and the first credential information.

After receiving the third device identifier and the third credential information, the smart home device 53 may update, based on the third device identifier and the third credential information, the locally stored first device identifier and first credential information, as shown in step S1616 in FIG. 16.

It should be noted that, in step S1613 to step S1616 described above, when a plurality of smart home devices 53 need to be registered, the home host 51 and the smart home platform 54 may register the plurality of smart home devices 53 one by one, or the home host 51 and the smart home platform 54 may register the plurality of smart home devices 53 together.

For example, it is assumed that five smart home devices 53, such as a smart sound box and a smart screen, need to be registered.

In some embodiments, after the home host 51 sends the third registration request to the smart home platform 54, the smart home platform 54 may return a third device identifier and third credential information, and bind the third device identifier and the third credential information to the first user account.

The home host 51 may update the first device identifier and the first credential information of the smart sound box with the third device identifier and the third credential information, and deliver the third device identifier and the third credential information to the smart sound box.

Then, the home host 51 may send a second third registration request, and the smart home platform 54 may return a second third device identifier and second third credential information after receiving the second third registration request.

The home host 51 may update a first device identifier and first credential information of the smart screen with the second third device identifier and the second third credential information, and deliver the second third device identifier and the second third credential information to the smart screen.

By analogy, the home host 51 and the smart home platform 54 may repeat the foregoing steps to register each smart home device 53 one by one, until all the smart home devices 53 are registered with the smart home platform 54.

In some other embodiments, the third registration request sent by the home host 51 to the smart home platform 54 may include the device information of the five smart home devices 53.

After receiving the third registration request, the smart home platform 54 may determine, based on the device information in the third registration request, that a quantity of the smart home devices 53 is 5. In this case, the smart home platform may return five third device identifiers and five pieces of third credential information to the home host, and indicates a third device identifier and third credential information that correspond to each piece of device information. Device information of one smart home device 53 corresponds to one third device identifier and one piece of third credential information.

After receiving the plurality of third device identifiers and the third credential information, the home host 51 may update a first device identifier and first credential information that correspond to each smart home device 53 with a third device identifier and the third credential information that correspond to the smart home device 53, and deliver the third device identifier and the third credential information that correspond to the smart home device 53.

In some embodiments, because the third secure connection is established based on the first credential information, after the credential information of the smart home device 53 is changed to the third credential information, the smart home device 53 and the home host 51 may not be able to communicate through the third secure connection. Therefore, the smart home device 53 may negotiate a sixth session key with the home host 51 based on the third credential information, establish a sixth secure connection, and restore trusted communication with the home host 51, as shown in step S1617 in FIG. 16.

In some embodiments, after the home host 51 and the smart home device 53 register with the first user account, the smart home platform 54 may send a registration success notification to the mobile phone 52, as shown in step S1618 in FIG. 16.

Figure 17:
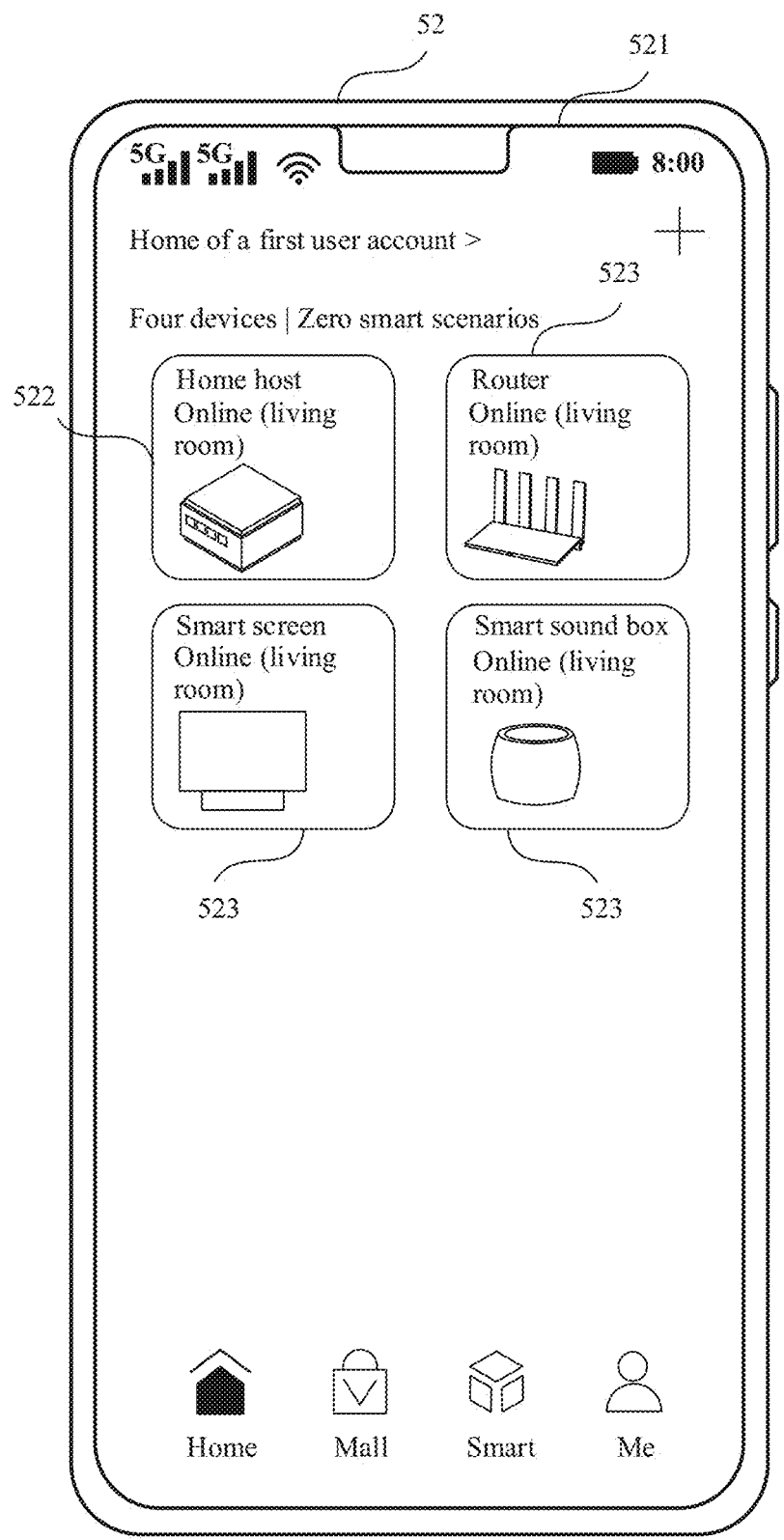
FIG. 17 is a schematic diagram of another scenario according to an embodiment of this application.

In some embodiments, after the mobile phone 52 receives the registration success notification, as shown in FIG. 17, the mobile phone 52 may add a control 522 for controlling the home host 51 and controls 523 for controlling the smart home devices 53 to a house-wide control interface 521.

Then, the user may control the home host 51 and the smart home devices 53 by operating the control 522 and the controls 523.

It should be noted that, in a case in which the smart home devices 53 are registered with the home host 51, only when a user is in a home area, the user can control the mobile phone 52 to access the local area network and log in to the home host 51, and obtain an operation permission of the smart home devices 53.

However, in a case in which both the home host 51 and the smart home devices 53 register with the first user account, if the mobile phone 52 logs in to the first user account, the user can control the home host 51 and the smart home devices 53 in the local area network by using the mobile phone 52 after the mobile phone 52 accesses the local area network. Alternatively, when the mobile phone 52 does not access the local area network, the user may access the smart home platform 54 by using the mobile phone 52, and control the home host 51 and the smart home devices 53 by using the smart home platform 54.

That is, in a case in which both the home host 51 and the smart home devices 53 register with the first user account, the user may control the home host 51 and the smart home device 53 at a short distance in the home area, or the user may remotely control the home host 51 and the smart home device 53 outside the home area.

It can be learned from the foregoing example that when the local area network can access the Internet, the user equipment may register an unregistered device in the local area network with a smart home platform in response to a device delivery operation of the user.

The unregistered device includes a hub device. After the hub device is registered with the smart home platform, the hub device can automatically perform proxy registration to register the registered device with the smart home platform.

According to the foregoing method, the user can register the hub device and the registered device with the smart home platform only by performing one device delivery operation, and does not need to register the hub device and the registered device one by one. The operation is simple, and user experience can be effectively improved.

For example, in the installation phase, before the house is delivered, the field engineer may use the installation and maintenance device (for example, a mobile phone of the field engineer) to register, with the hub device, various smart home devices (for example, a light, a smart lock, a smart curtain, and an alarm) in the house.

After the house is delivered, if the household enables a home Internet cable, the household may perform the device delivery operation on a personal device of the household (for example, a mobile phone of the household). In this case, the personal device of the household may register the hub device and the another unregistered smart home device in the local area network with the smart home platform, and bind the hub device and the another unregistered smart home device to the first user account to which the personal device of the household currently logs in.

After registering the hub device with the first user account, the hub device may automatically perform registration on behalf of each registered device, and register each registered device with the first user account.

In other words, according to the device registration method provided in this embodiment of this application, the field engineer may register all smart home devices with the hub device one by one, to help the user complete most operations of device registration in advance. After the household enables the home Internet cable, the household only needs to perform one device delivery operation, and then the hub device and the registered device can be registered with the first user account. The household does not need to register the hub device and the registered device one by one. This greatly simplifies the registration operations of the household, effectively improves use experience of the household, and has strong usability and practicability.

6. Cancel Registration.

When the user needs to change the first user account bound to the hub device and the registered device, the user may send a status restoration instruction to the hub device through the user equipment, or the user may directly input the status restoration instruction to the hub device.

When the hub device obtains the status restoration instruction, the hub device may send a first unbinding instruction to the smart home platform. The first unbinding instruction may include the third device identifier of the registered device, and the first unbinding instruction instructs the smart home platform to unbind the registered device from the first user account.

When the smart home platform receives the first unbinding instruction, the smart home platform may determine, based on the third device identifier, the registered device that needs to be unbound, and unbind the registered device from the first user account.

In addition, the hub device may delete the third device identifier and the third credential information that are delivered by the smart home platform, roll back to the first device identifier and the first credential information, and deliver the first device identifier and the first credential information to the registered device.

When the registered device receives the first device identifier and the first credential information, the locally stored third device identifier and third credential information may be updated with the first device identifier and the first credential information.

In some embodiments, the hub device may further send a second unbinding instruction to the smart home platform. The second unbinding instruction includes a second device identifier of the hub device, and the second unbinding instruction instructs the smart home platform to unbind the hub device from the first user account.

When the smart home platform receives the second unbinding instruction, the smart home platform may determine, based on the second device identifier, the hub device that needs to be unbound, and unbind the hub device from the first user account.

Then, the hub device may clear the information related to the first user account, and roll back to a state before registration.

Afterwards, if the user wants to bind the hub device and the registered device to another user account, the user may change the user account, and register the hub device and the registered device with the another user account according to the descriptions in the section 3.

Refer to the foregoing example. It is assumed that the user wants to rent a house to a tenant. However, both the home host 51 and the smart home device 53 in the house are registered with the first user account of the user, and only the first user account can be used.

In this case, to transfer control permissions of the home host 51 and the smart home device 53, the user may perform an operation on the mobile phone 52, and enter a house-wide control interface 521 shown in FIG. 17.

Figure 18:
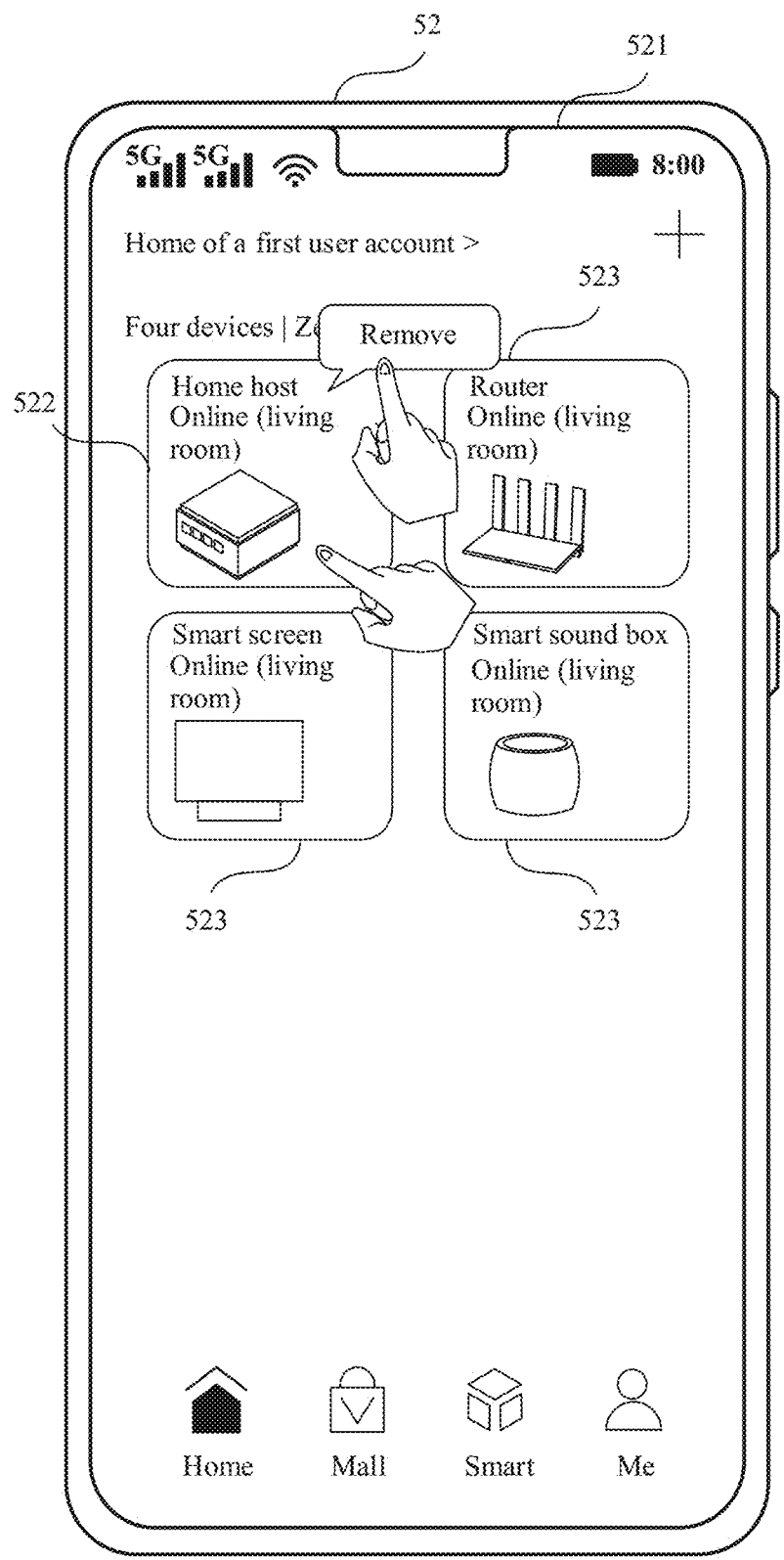
FIG. 18 is a schematic diagram of another scenario according to an embodiment of this application.

As shown in FIG. 18, the user may press and hold a control 522 for controlling the home host. In some embodiments, the mobile phone 52 may display a "Remove" option above the control 522 in response to an operation of the user.

After the user taps the "Remove" option, the mobile phone 52 may respond to the operation of the user, and enter an unbinding procedure.

Figure 19:
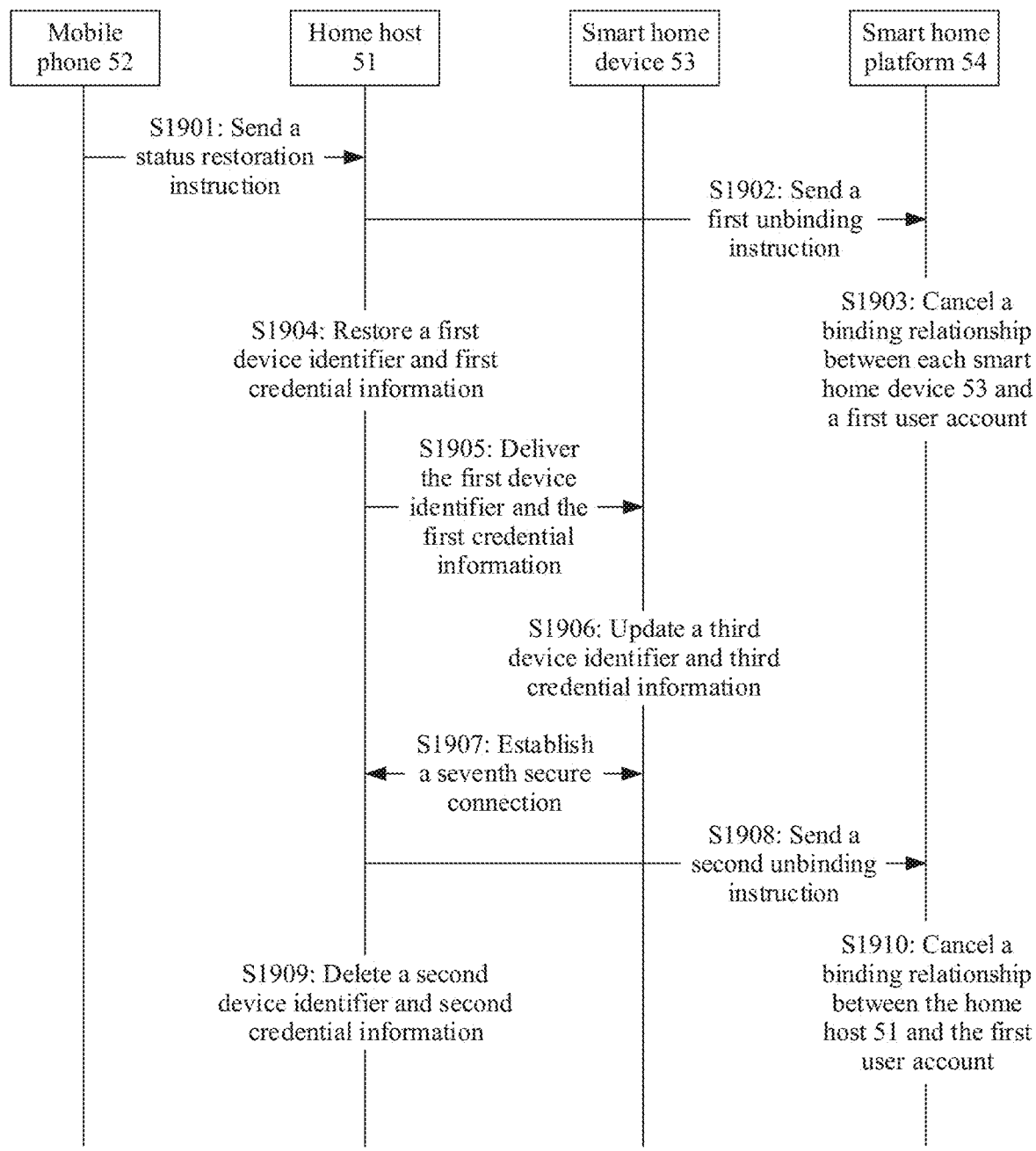
FIG. 19 is another device interaction diagram according to an embodiment of this application.

FIG. 19 shows an example of a device interaction diagram of an implementation of unbinding the home host 51 and the smart home device 53 from the first user account by using the mobile phone 52 in the scenario shown in FIG. 14.

In the unbinding procedure, the mobile phone 52 may send a status restoration instruction to the home host 51, as shown in step S1901 in FIG. 19.

When the home host 51 receives the status restoration instruction, the home host 51 may send a first unbinding instruction to the smart home platform 54, as shown in step S1902 in FIG. 19. The first unbinding instruction includes the third device identifier of each smart home device 53.

After receiving the first unbinding instruction, the smart home platform 54 may unbind each smart home device 53 from the first user account, as shown in step S1903 in FIG. 19.

Then, the home host 51 may delete the locally stored third device identifier and third credential information, restore the first device identifier and the first credential information, and deliver the corresponding first device identifier and the first credential information to each smart home device 53, as shown in step S1904 and step S1905 in FIG. 19.

After receiving the first device identifier and the first credential information, the smart home device 53 may update, based on the first device identifier and the first credential information, the locally stored third device identifier and third credential information, as shown in step S1906 in FIG. 19.

In some embodiments, the smart home device 53 may establish a seventh secure connection with the home host 51 based on the first credential information, as shown in step S1907 in FIG. 19.

In this way, a process of unbinding the smart home device 53 from the first user account is completed.

In some embodiments, a process of unbinding the home host 51 from the first user account may be further executed.

In some embodiments, the home host 51 may further send a second unbinding instruction to the smart home platform 54, and delete the locally stored second device identifier and second credential information, as shown in step S1908 and step S1909 in FIG. 19. The second unbinding instruction may include a second device identifier of the home host 51.

After receiving the second unbinding instruction, the smart home platform 54 may unbind the home host 51 from the first user account, as shown in step S1910 in FIG. 19.

In this case, both the home host 51 and the smart home device 53 are restored to a state before the house delivery process.

Figure 20:
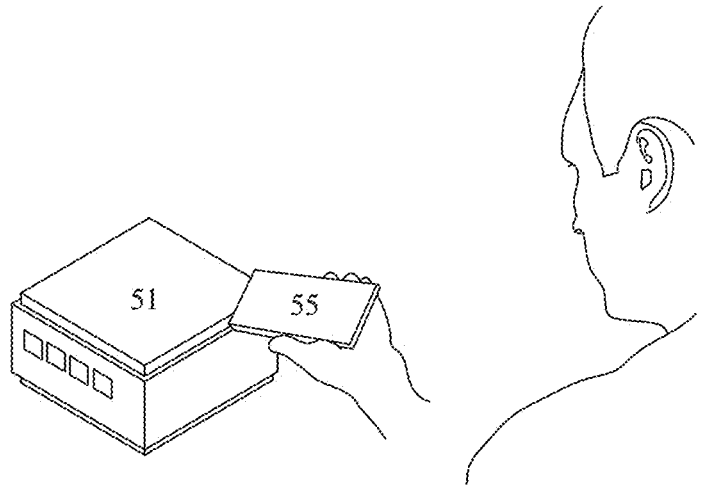
FIG. 20 is a schematic diagram of another scenario according to an embodiment of this application.

As shown in FIG. 20, after the tenant checks in, if the tenant wants to register the home host 51 and the smart home device 53 with a second user account, the tenant may perform a device delivery operation on a mobile phone 55. For example, the mobile phone 55 taps the home host 51, where the mobile phone 55 is user equipment of the tenant, and the second user account is a user account to which the mobile phone 55 currently logs in.

In this case, the mobile phone 55 may register the home host 51 and the smart home device 53 with the second user account according to the procedure described in the foregoing example.

It can be learned from the foregoing example that, when the user wants to unbind the hub device and the registered device from the first user account, the hub device may perform unbinding on behalf of each registered device, and therefore, the user does not need to perform an operation on each registered device. Ibis simplifies the process of unbinding the registered device, reduces operation steps of the user, and improves user experience.

In conclusion, in the device registration method in this embodiment of this application, when a smart home device cannot access the Internet, user equipment may use a hub device as an edge server to register the smart home device with the hub device.

Then, the user may directly operate the hub device or indirectly operate the hub device, to perform coordinated management on all registered devices. In this case, difficulty in device management is reduced, and user experience is improved.

In addition, when the hub device and the smart home device can access the Internet, the user may perform a device delivery operation. In this case, the hub device may perform registration on behalf of the registered device, and automatically register each registered device with the smart home platform, so that the user does not need to register registered devices one by one. In this case, steps in a device registration process are greatly reduced.

In addition, when the user wants to unbind the hub device and the registered device from the first user account, the hub device may perform unbinding on behalf of each registered device. The operation is simple, and the user does not need to unbind registered devices one by one. In this case, steps in the device deregistration procedure are greatly reduced.

In addition, in the unbinding process, the hub device may re-register each registered device with the hub device. Then, the user may continue to perform coordinated management on all registered devices by using the hub device, or may quickly register the hub device and the registered device with another user account by executing the foregoing house delivery procedure.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

In addition, not all steps described in the foregoing embodiments are necessary steps. In an actual application scenario, the device registration method may have more or fewer steps than those in the foregoing embodiments, or some of the steps described above are performed.

For example, in some embodiments, an identity authentication step may not need to be set on the hub device, and any user equipment may directly access the hub device without login. In some other embodiments, the hub device and the smart home platform may directly use a registration code as credential information in the registration process, and do not need to generate and deliver credential information when verification succeeds. In some other embodiments, in a process of connection establishment, an electronic device may directly exchange data through an unencrypted connection without negotiating a session key. In some other embodiments, a corresponding step and procedure may also be added on the foregoing electronic device based on a new function.

In addition, in the foregoing embodiments, the user equipment described in each section may be same user equipment, and/or may be different user equipment. For example, in some scenarios, the user equipment described in the foregoing sections may all be user equipment of a field engineer. In other scenarios, the field engineer may register a smart home device with a hub device according to the method described in section 3. After a house owner checks in, the house owner may implement the methods described in sections 4, 5, and 6 with user equipment of the house owner. In this scenario, the user equipment described in the foregoing sections is not same user equipment.

Figure 21:
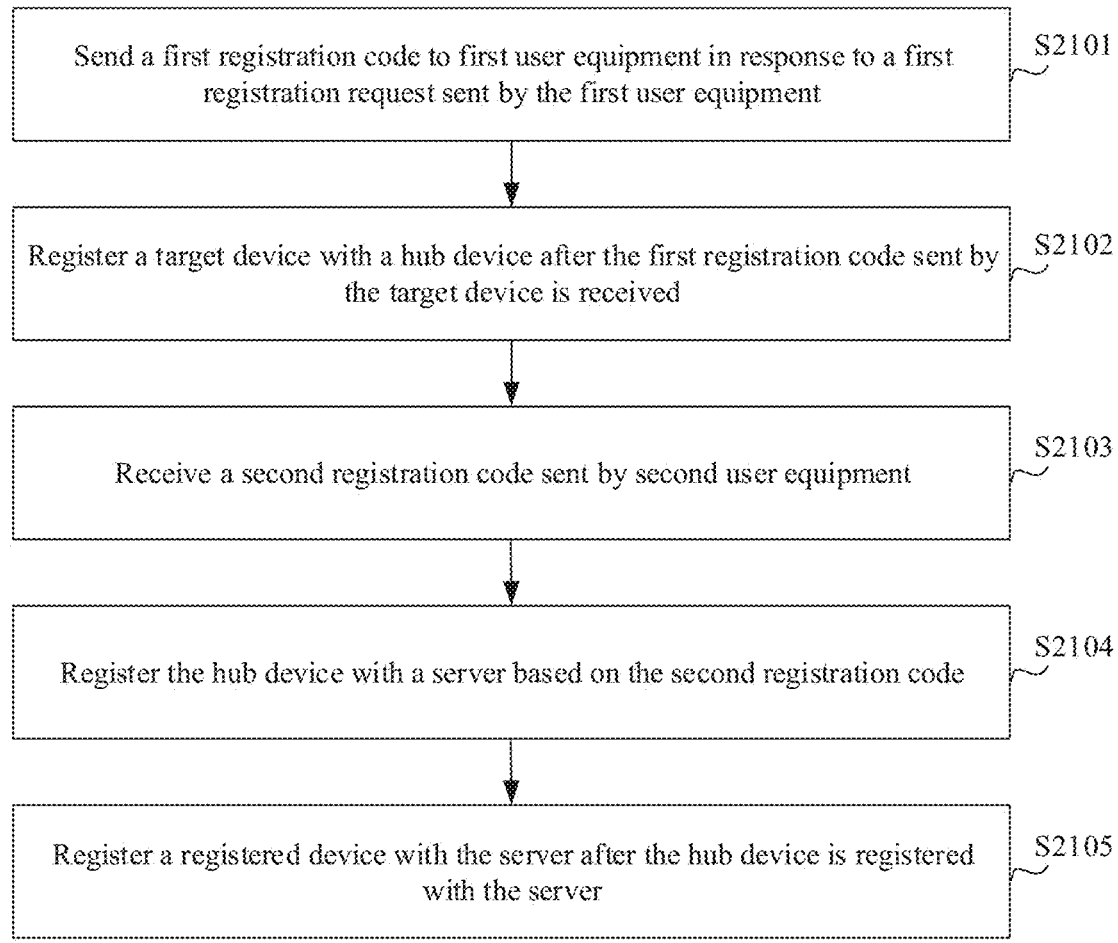
FIG. 21 is a schematic flowchart of a device registration method according to an embodiment of this application.

The following describes in detail, from a perspective of a hub device, another device registration method provided in an embodiment of this application. Refer to FIG. 21. The device registration method provided in this embodiment includes the following steps.

S2101: Send a first registration code to first user equipment in response to a first registration request sent by the first user equipment.

It should be noted that, in a scenario in which a smart home device cannot communicate with a server, and/or a user does not determine a user account with which the smart home device is to be registered, if the user wants to perform coordinated management on all smart home devices, the user may use a hub device in a home as an edge server, and register the smart home device with the hub device.

Specifically, the user may perform a device registration operation on the first user equipment. In response to the device registration operation of the user, the first user equipment may determine a to-be-registered target device, and send the first registration request to the hub device.

The hub device may send the first registration code to the first user equipment in response to the first registration request.

S2102: Register the target device with the hub device after receiving the first registration code sent by the target device.

It should be noted that the first user equipment may forward the first registration code to the target device after receiving the first registration code.

The target device may send the first registration code to the hub device after receiving the first registration code forwarded by the first user equipment.

The hub device may register the target device with the hub device after receiving the first registration code sent by the target device.

A process in which the first user equipment registers the target device with the hub device may be understood as a process in which the first user equipment grants an operation permission of the target device to the hub device. Registering, by the hub device, the target device with the hub device may be understood as registering, by the hub device, the operation permission of the target device on the hub device.

Therefore, after the first user equipment assists the hub device in registering each target device with the hub device, the hub device may obtain an operation permission of each registered device, and the user may perform coordinated management on registered devices with the hub device.

For example, in an installation scenario (that is, an application scenario in which some smart home devices are installed in a decoration phase before a house is delivered to a household), an Internet cable is not enabled in a home area, and it is difficult for a field engineer to learn a user account of the household. In this case, the field engineer may use user equipment of the field engineer to register each smart home device with the hub device according to the foregoing method.

Then, the field engineer or another user may perform, with the hub device, coordinated management on smart home devices that are registered with the hub device.

S2103: Receive a second registration code sent by second user equipment, where the second user equipment and the first user equipment are same user equipment or different user equipment.

It should be noted that, when the smart home device can communicate with the server, and a specified user account is determined, the user may want to register the hub device and the registered device with the server.

In this case, the user may perform a device delivery operation on the second user equipment that logs in to the first user account. The second user equipment may send a second registration request to the server in response to the device delivery operation of the user.

After receiving the second registration request, the server may send the second registration code to the second user equipment.

After receiving the second registration code, the second user equipment forwards the second registration code to the hub device.

S2104: Register the hub device with the server based on the second registration code.

It should be noted that, after receiving the second registration code, the hub device may register the hub device with the server.

Specifically, after receiving the second registration code, the hub device may send the second registration code to the server.

After receiving the second registration code sent by the hub device, the server may register the hub device with the server.

S2105: Register a registered device with the server after the hub device is registered with the server, where the registered device includes a target device that is registered with the hub device.

It should be noted that the hub device may further register the registered device with the server after the hub device is registered with the server.

Specifically, the hub device may send a third registration request to the server, and register the registered device with the server by using the third registration request.

Registering, by the hub device, the hub device and the registered device with the server may be understood as registering, by the hub device, operation permissions of the hub device and the registered device with the first user account of the server. The first user account is a currently logged-in user account of the second user equipment.

After the hub device and the registered device are registered with the server, the first user account has the operation permissions of the hub device and the registered device, and the second user equipment or another user equipment that logs in to the first user account may control the hub device and the registered device by using the first user account.

The first user equipment and the second user equipment may be same user equipment or different user equipment.

When the first user equipment and the second user equipment are different user equipment, a user using the second user equipment only needs to register the hub device with the server. The hub device can automatically register the registered device with the server. The user using the second user equipment does not need to register registered devices with the server one by one. This greatly reduces operations that need to be performed by the user, effectively improves user experience, and has strong usability and practicability.

For example, in the installation scenario, the first user equipment may be the user equipment of the field engineer, and the second user equipment may be the user equipment of the household.

Before the house is delivered, the field engineer may use the first user equipment to help the household register, with the hub device, every smart home device installed in advance.

After the house is delivered, the household may use the second user equipment of the household to register the hub device with the server.

The hub device may automatically register the registered device with the server after the hub device is registered with the server. The household does not need to register the registered devices one by one. In this case, workload of the household can be greatly reduced, and use experience of the household can be effectively improved.

Optionally, the method further includes:
after the status restoration instruction is obtained, instructing the server to cancel a registration relationship between the hub device and the server and/or a registration relationship between the registered device and the server.

It should be noted that, when the user wants to cancel the registration relationship between the hub device and the server and/or the registration relationship between the server and the registered device, the user equipment may directly perform an operation on the hub device to trigger the status restoration instruction, or the user may send the status restoration instruction to the hub device by using the user equipment of the user.

After the hub device obtains the status restoration instruction, the hub device may instruct the server to cancel the registration relationship between the hub device and the server and/or the registration relationship between the registered device and the server.

Optionally, the instructing the server to cancel a registration relationship between the hub device and the server and/or a registration relationship between the registered device and the server includes:

sending a first unbinding instruction to the server, where the first unbinding instruction instructs the server to cancel the registration relationship between the registered device and the server; and sending a second unbinding instruction to the server after the registration relationship between the registered device and the server is canceled, where the second unbinding instruction instructs the server to cancel the registration relationship between the hub device and the server.

It should be noted that, in addition to performing registration on behalf of the registered device, the hub device may further cancel the registration relationship on behalf of the registered device.

After the hub device obtains the status restoration instruction, the hub device may send the first unbinding instruction to the server.

After the server receives the first unbinding instruction, the server may cancel the registration relationship between the registered device and the server.

The hub device may send the second unbinding instruction to the server after the registration relationship between the registered device and the server is canceled.

After the server receives the second unbinding instruction, the server may cancel the registration relationship between the hub device and the server.

In other words, when the user wants to cancel the registration relationship between each registered device and the server, the user only needs to deliver the status restoration instruction to the hub device, and then, the hub device can automatically cancel the registration relationship between the hub device and the server and the registration relationship between the registered device and the server. The user does not need to cancel the registration relationship between the hub device and the server and the registration relationship between the registered device and the server one by one. This greatly reduces operations that need to be performed by the user and effectively improves user experience.

Optionally, after the sending the first unbinding instruction to the server, the method further includes:

restoring a registration relationship between the hub device and the registered device.

It should be noted that, in some embodiments, the registered device may retain only one registration relationship.

In this scenario, when the registered device is registered with the server, the registration relationship between the hub device and the registered device is cancelled.

Therefore, the hub device may restore the registration relationship between the hub device and the registered device after canceling the registration relationship between the registered device and the server.

Then, according to the foregoing device registration method, it is convenient for the user to register the hub device and the registered device as a whole with another user account of the server. In this case, operations of re-registering the hub device and the registered device by the user can be reduced, and user experience can be improved.

For example, when the household wants to rent a house to the tenant, the tenant needs to hand over the operation permissions of the hub device and the registered device to the tenant.

In this case, the user can issue a status restoration instruction to the hub device. The hub device may cancel, according to the state restoration instruction, the registration relationship between the registered device and the server and the registration relationship between the hub device and the server, and restore the registration relationship between the hub device and the registered device.

Then, the tenant may use the user equipment of the tenant, to register the hub device with the server and bind the hub device to the user account of the tenant.

After the hub device registers with the user account of the tenant, the hub device may automatically register the registered device with the user account of the tenant.

In other words, according to the foregoing method, it is convenient for the household and the tenant to hand over the operation permissions of the hub device and the registered device to another user account as a whole, and the tenant does not need to register the hub device and the registered device one by one. This greatly reduces operations of the tenant and improves use experience of the tenant.

Optionally, after the registering the target device with the hub device, the method further includes:

receiving control information sent by third user equipment, where the control information includes a device identifier of a to-be-controlled registered device and a control instruction; and forwarding the control instruction to the registered device corresponding to the device identifier.

It should be noted that, after the registered device is registered with the hub device, the user may directly send the control information to the hub device by using the user equipment of the user, and control each registered device with the hub device.

In this case, the user may perform a control operation on the third user equipment. The third user equipment determines the to-be-controlled registered device and a control instruction in response to the control operation. The control instruction instructs the to-be-controlled registration device to perform an operation specified by the user.

Then, the third user equipment may send the control information to the hub device, where the control information may include the device identifier of the to-be-controlled registered device and the control instruction.

After receiving the control information, the hub device may forward the control instruction to the registered device corresponding to the device identifier.

After receiving the foregoing control instruction, the to-be-controlled registered device may perform an operation corresponding to the foregoing control instruction.

Optionally, after the registering the target device with the hub device, the method further includes:

determining the to-be-controlled registered device and the control instruction in response to the control operation of the user; and sending the control instruction to the to-be-controlled registered device.

It should be noted that after the registered device is registered with the hub device, alternatively, the user may directly control each registered device with the hub device.

In this case, the user may directly perform the control operation on the hub device. The hub device determines the to-be-controlled registered device and the control instruction in response to the control operation.

Then, the hub device may deliver the control instruction to the to-be-controlled registered device.

After receiving the foregoing control instruction, the to-be-controlled registered device may perform the operation corresponding to the foregoing control instruction.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 22:
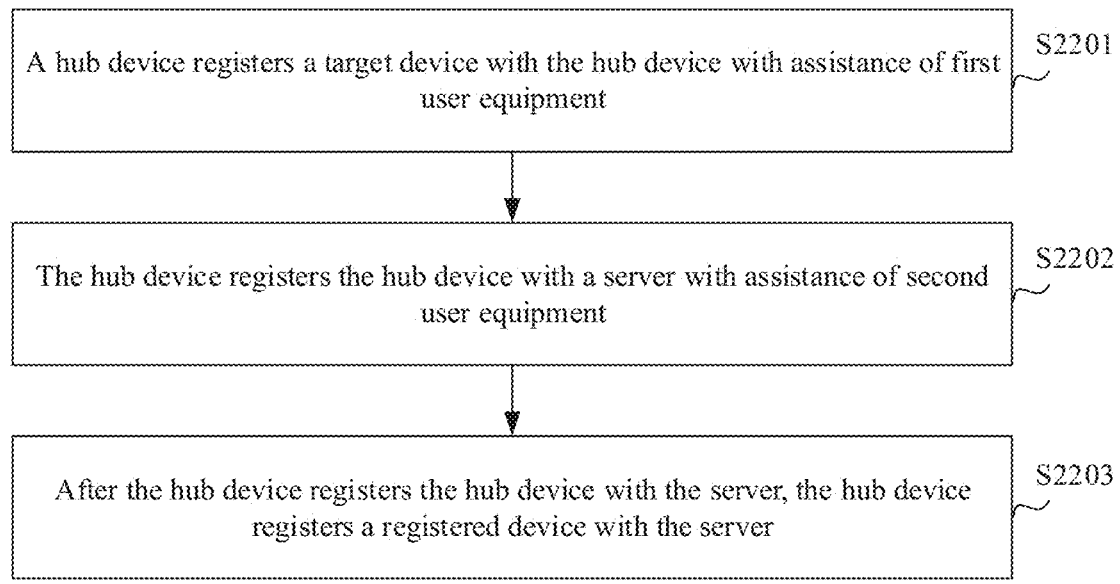
FIG. 22 is a schematic flowchart of another device registration method according to an embodiment of this application.

The following describes in detail, from a perspective of a device registration system, another device registration method provided in an embodiment of this application. Refer to FIG. 22. The device registration method provided in this embodiment includes the following steps.

S2201: A hub device registers a target device with the hub device with assistance of first user equipment.

It should be noted that, in a scenario in which a smart home device cannot communicate with a server, and/or a user does not determine a user account with which the smart home device is to be registered, if the user wants to perform coordinated management on all smart home devices, the user may use a hub device in a home as an edge server, and register the smart home device with the hub device.

In this case, with assistance of the first user equipment, the hub device may register the target device with the hub device.

S2202: The hub device registers the hub device with a server with assistance of second user equipment, where the second user equipment and the first user equipment are same user equipment or different user equipment.

It should be noted that, when the smart home device can communicate with the server, and the user determines the first user account, the hub device may register the hub device with the server with assistance of the second user equipment.

The first user account is a user account specified by the user, or may be understood as a currently logged-in user account of the second user equipment.

S2203: After the hub device registers the hub device with the server, the hub device registers a registered device with the server, where the registered device includes the target device that is registered with the hub device.

It should be noted that, after the hub device is registered with the server, the hub device may perform registration on behalf of the registered device, and register the registered device with the server.

The first user equipment and the second user equipment may be same user equipment or different user equipment.

When the first user equipment and the second user equipment are different user equipment, a user using the second user equipment only needs to register the hub device with the server. The hub device can automatically register the registered device with the server. The user using the second user equipment does not need to register registered devices with the server one by one. This greatly reduces operations that need to be performed by the user, effectively improves user experience, and has strong usability and practicability.

Optionally, the method further includes:

The hub device indicates the server to cancel a registration relationship between the hub device and the server and/or a registration relationship between the registered device and the server after obtaining the status restoration instruction.

It should be noted that, when the user wants to cancel the registration relationship between the hub device and the server and/or the registration relationship between the server and the registered device, the user equipment may directly perform an operation on the hub device to trigger the status restoration instruction, or the user may send the status restoration instruction to the hub device by using the user equipment of the user.

After the hub device obtains the status restoration instruction, the hub device may instruct the server to cancel the registration relationship between the hub device and the server and/or the registration relationship between the registered device and the server.

Optionally, that a hub device registers a target device with the hub device with assistance of first user equipment specifically includes:

The first user equipment determines the to-be-registered target device in response to a device registration operation of the user, and sends a first registration request to the hub device:

the hub device sends a first registration code to the first user equipment in response to the first registration request, so that the first user equipment sends the first registration code to the target device; and the target device sends the first registration code to the hub device, and the hub device, registers the target device with the hub device in response to receiving the first registration code.

It should be noted that in a process of registering the target device with the hub device, the user may perform a device registration operation on the first user equipment. In response to the device registration operation of the user, the first user equipment may determine the to-be-registered target device, and send the first registration request to the hub device.

The hub device may send the first registration code to the first user equipment in response to the first registration request.

The first user equipment may forward the first registration code to the target device after receiving the first registration code.

The target device may send the first registration code to the hub device after receiving the first registration code forwarded by the first user equipment.

The hub device may register the target device with the hub device after receiving the first registration code sent by the target device.

A process in which the first user equipment registers the target device with the hub device may be understood as a process in which the first user equipment grants an operation permission of the target device to the hub device. Registering, by the hub device, the target device with the hub device may be understood as registering, by the hub device, the operation permission of the target device on the hub device.

Therefore, after the first user equipment assists the hub device in registering each target device with the hub device, the hub device may obtain an operation permission of each registered device, and the user may perform coordinated management on registered devices with the hub device.

For example, in an installation scenario (an application scenario in which some smart home devices are installed in a decoration phase before a house is delivered to a household), an Internet cable is not enabled in a home area, and it is difficult for a field engineer to learn a user account of the household. In this scenario, the field engineer may use user equipment of the field engineer to register each smart home device with the hub device according to the foregoing method.

Then, the field engineer or another user may perform, with the hub device, coordinated management on smart home devices that are registered with the hub device.

Optionally, that the hub device registers the hub device with a server with assistance of second user equipment specifically includes:

The second user equipment sends a second registration request to the server in response to the device delivery operation of the user,
- the server sends a second registration code to the second user equipment in response to the second registration request, so that the second user equipment sends the second registration code to the hub device; and
- the hub device registers the hub device with the server in response to receiving the second registration code.

It should be noted that, in a process of registering the hub device with the server, the user may perform a device delivery operation on the second user equipment that logs in to the first user account. The second user equipment may send a second registration request to the server in response to the device delivery operation of the user.

After receiving the second registration request, the server may send the second registration code to the second user equipment.

After receiving the second registration code, the second user equipment forwards the second registration code to the hub device.

After receiving the second registration code, the hub device may send the second registration code to the server.

After receiving the second registration code sent by the hub device, the server may register the hub device with the server.

Optionally, that the hub device indicates the server to cancel a registration relationship between the hub device and the server and/or a registration relationship between the registered device and the server after obtaining the status restoration instruction specifically includes:

The hub device may send a first unbinding instruction to the server after obtaining the status restoration instruction;
- the server cancels the registration relationship between the registered device and the server in response to the first unbinding instruction;
- the hub device may send a second unbinding instruction to the server after the registration relationship between the registered device and the server is canceled; and
- the server cancels the registration relationship between the hub device and the server in response to the second unbinding instruction.

It should be noted that, in addition to performing registration on behalf of the registered device, the hub device may further cancel the registration relationship on behalf of the registered device.

After the hub device obtains the status restoration instruction, the hub device may send the first unbinding instruction to the server.

After the server receives the first unbinding instruction, the server may cancel the registration relationship between the registered device and the server.

The hub device may send the second unbinding instruction to the server after the registration relationship between the registered device and the server is canceled.

After the server receives the second unbinding instruction, the server may cancel the registration relationship between the hub device and the server.

In other words, when the user wants to cancel the registration relationship between each registered device and the server, the user only needs to deliver the status restoration instruction to the hub device, and then, the hub device can automatically cancel the registration relationship between the hub device and the server and the registration relationship between the registered device and the server. The user does not need to cancel the registration relationship between the hub device and the server and the registration relationship between the registered device and the server one by one. This greatly reduces operations that need to be performed by the user and effectively improves user experience.

Optionally, after the first unbinding instruction is sent to the server, the method further includes:

The hub device restores the registration relationship between the hub device and the registered device.

It should be noted that, in some embodiments, the registered device may retain only one registration relationship.

In this scenario, when the registered device is registered with the server, the registration relationship between the hub device and the registered device is cancelled.

Therefore, the hub device may restore the registration relationship between the hub device and the registered device after canceling the registration relationship between the registered device and the server.

Then, according to the foregoing device registration method, it is convenient for the user to register the hub device and the registered device as a whole with another user account of the server. In this case, operations of re-registering the hub device and the registered device by the user can be reduced, and user experience can be improved.

Optionally, after the hub device registers the target device with the hub device, the method further includes:

The third user equipment determines the to-be-controlled registered device and the control instruction in response to the control operation of the user:
- the third user equipment sends the control information to the hub device, where the control information includes a device identifier of the to-be-controlled registered device and the control instruction; and
- in response to receiving the control information, the hub device forwards the control instruction to the registered device corresponding to the device identifier.

It should be noted that, after the registered device is registered with the hub device, the user may directly send the control information to the hub device by using the user equipment of the user, and control each registered device with the hub device.

Optionally, after the hub device registers the target device with the hub device, the method further includes:

The hub device determines the to-be-controlled registered device and the control instruction in response to the control operation of the user; and
- the hub device sends the control instruction to the to-be-controlled registered device.

It should be noted that after the registered device is registered with the hub device, alternatively, the user may directly perform a control operation on the hub device, and control each registered device with the hub device.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

Figure 23:
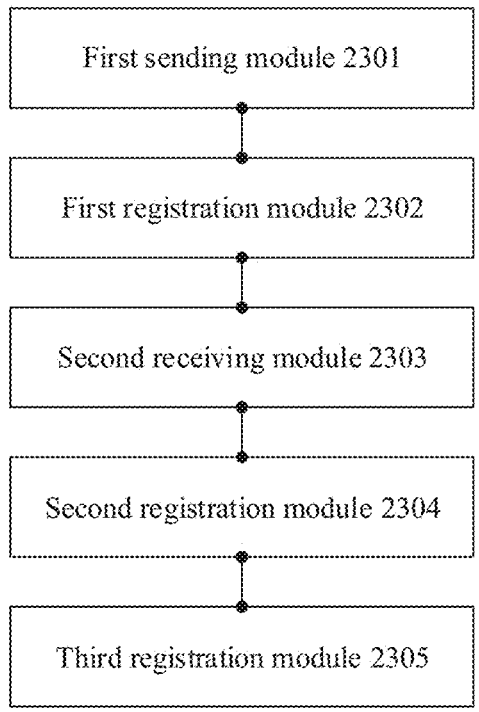
FIG. 23 is a schematic diagram of a structure of a device registration apparatus according to an embodiment of this application.

Corresponding to the device registration method described in the foregoing embodiments, FIG. 23 is a block diagram of a structure of a device registration apparatus according to an embodiment of this application. For ease of description, only a part related to this embodiment of this application is shown.

The apparatus may be applied to a hub device. Refer to FIG. 23. The apparatus includes:
- a first sending module 2301, configured to send a first registration code to first user equipment in response to a first registration request sent by the first user equipment;
- a first registration module 2302, configured to register a target device with the hub device after receiving the first registration code sent by the target device;
- a second receiving module 2303, configured to receive a second registration code sent by second user equipment, where the second user equipment and the first user equipment are same user equipment or different user equipment;
- a second registration module 2304, configured to register the hub device with a server based on the second registration code; and
- a third registration module 2305, configured to register a registered device with the server after the hub device is registered with the server, where the registered device includes the target device that is registered with the hub device.

Optionally, the apparatus further includes:
- a registration cancellation module, configured to instruct the server to cancel a registration relationship between the hub device and the server and/or a registration relationship between the registered device and the server after a status restoration instruction is obtained.

Optionally, the registration cancellation module includes:
- a first unbinding submodule, configured to send a first unbinding instruction to the server, where the first unbinding instruction instructs the server to cancel the registration relationship between the registered device and the server; and
- a second unbinding submodule, configured to send a second unbinding instruction to the server after the registration relationship between the registered device and the server is canceled, where the second unbinding instruction instructs the server to cancel the registration relationship between the hub device and the server.

Optionally, the apparatus further includes:
- a registration restoration module, configured to restore the registration relationship between the hub device and the registered device.

Optionally, the apparatus further includes;
- a control receiving module, configured to receive control information sent by third user equipment, where the control information includes a device identifier of a to-be-controlled registered device and a control instruction; and
- a relay control module, configured to forward the control instruction to the registered device corresponding to the device identifier.

Optionally, the apparatus further includes:
- a control response module, configured to determine a to-be-controlled registered device and a control instruction in response to a control operation of a user; and
- a direct control module, configured to send the control instruction to the to-be-controlled registered device.

A person skilled in the art may clearly understand that, for the purpose of convenient and brief description, division into the foregoing functional units and modules is merely used as an example for description. In an actual application, the foregoing functions may be allocated to different functional units and modules for implementation based on a requirement. That is, an inner structure of the apparatus is divided into different functional units or modules, to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units and modules are merely for distinguishing between the functional units and modules, but are not intended to limit the protection scope of this application. For a specific working process of the units or modules in the foregoing apparatus, refer to a corresponding process in the foregoing method embodiments. Details are not described herein again.

Figure 24:
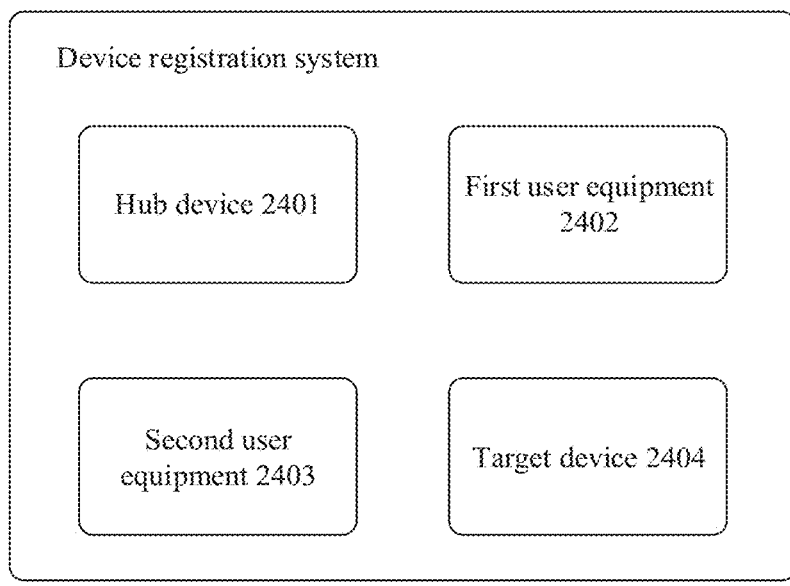
FIG. 24 is a diagram of a system architecture of another device registration system according to an embodiment of this application.

Corresponding to the device registration method described in the foregoing embodiments, FIG. 24 is a diagram of another system structure of a device registration system according to an embodiment of this application. For ease of description, only a part related to this embodiment of this application is shown.

As shown in FIG. 24, the system includes a hub device 2401, first user equipment 2402, second user equipment 2403, and a target device 2404. The hub device 2401 is configured to:
- register the target device 2404 with the hub device 2401 with assistance of first user equipment 2402;
- register the hub device 2401 with a server with assistance of the second user equipment 2403, where the second user equipment 2403 and the first user equipment 2402 are same user equipment or different user equipment; and
- register a registered device with the server after the hub device 2401 registers the hub device 2401 with the server, where the registered device includes the target device 2404 that is registered with the hub device 2401.

Optionally, the hub device 2401 is further configured to: after a status restoration instruction is obtained, instruct the server to cancel a registration relationship between the hub device 2401 and the server and/or a registration relationship between the registered device and the server.

Optionally, in a process in which the hub device 2401 registers the target device 2404 with the hub device 2401 with assistance of first user equipment 2402:
The first user equipment 2402 is configured to determine the to-be-registered target device 2404 in response to a device registration operation of the user, and send a first registration request to the hub device 2401;
the hub device 2401 is configured to send a first registration code to the first user equipment 2402 in response to the first registration request;
the first user equipment 2402 is further configured to send the first registration code to the target device 2404;
the target device 2404 is configured to send the first registration code to the hub device 2401; and
the hub device 2401 is further configured to register the target device 2404 with the hub device 2401 in response to receiving the first registration code.

Optionally, in a process in which the hub device 2401 registers the hub device 2401 with the server with assistance of the second user equipment 2403:
The second user equipment 2403 is configured to send a second registration request to the server in response to a device delivery operation of a user:

the server is configured to send a second registration code to the second user equipment 2403 in response to the second registration request;

the second user equipment 2403 is further configured to send the second registration code to the hub device 2401; and the hub device 2401 is configured to register the hub device 2401 with the server in response to receiving the second registration code.

Optionally, in a process in which the hub device 2401 indicates the server to cancel the registration relationship between the hub device 2401 and the server and/or the registration relationship between the registered device and the server after obtaining the status restoration instruction:

The hub device 2401 is configured to send a first unbinding instruction to the server after obtaining the status restoration instruction;

the server is configured to cancel the registration relationship between the registered device and the server in response to the first unbinding instruction;

the hub device 2401 is further configured to send a second unbinding instruction to the server after the registration relationship between the registered device and the server is canceled: and the server is further configured to cancel the registration relationship between the hub device 2401 and the server in response to the second unbinding instruction.

Optionally, the hub device 2401 is further configured to restore the registration relationship between the hub device 2401 and the registered device.

Optionally, the system further includes third user equipment.

The third user equipment is configured to determine a to-be-controlled registered device and a control instruction in response to a control operation of a user.

The third user equipment is configured to send the control information to the hub device 2401, where the control information includes a device identifier of the to-be-controlled registered device and the control instruction.

The hub device 2401 is further configured to: in response to receiving the control information, forward the control instruction to the registered device corresponding to the device identifier.

Optionally, the hub device 2401 is further configured to:
determine a to-be-controlled registered device and a control instruction in response to a control operation of the user; and send the control instruction to the to-be-controlled registered device.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiments are merely examples. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. The parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated module/unit is implemented in a form of a software functional unit and is sold or used as an independent product, the integrated unit may be stored in a computer-readable storage medium. Based on such an understanding, in this application, all or some of the procedures of the method in the foregoing embodiments may be implemented by a computer program instructing related hardware. The computer program may be stored in a computer-readable storage medium. When the computer program is executed by a processor, the steps in the foregoing method embodiment can be implemented. The computer program includes computer program code, and the computer program code may be in a form of source code, a form of object code, a form of an executable file, some intermediate forms, or the like. The computer-readable storage medium may include: any entity or apparatus that can carry computer program code, a recording medium, a USB flash drive, a removable hard disk, a magnetic disk, an optical disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to legislation and patent practice, the computer-readable storage medium does not include the electrical carrier signal or the telecommunication signal.

In conclusion, the foregoing description is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for device registration, applied to a hub device, wherein the method comprises:
sending a first registration code to first user equipment in response to a first registration request sent by the first user equipment;
registering a target device with the hub device after receiving the first registration code sent by the target device;

receiving a second registration code sent by second user equipment, wherein the second user equipment and the first user equipment are same user equipment or different user equipment;
registering the hub device with a server based on the second registration code; and
registering a registered device with the server after the hub device is registered with the server, wherein the registered device comprises the target device that is registered with the hub device.

2. The method according to claim 1, wherein the method further comprises:
instructing the server to cancel at least one of a registration relationship between the hub device and the server or a registration relationship between the registered device and the server after obtaining a status restoration instruction.

3. The method according to claim 2, wherein the instructing the server to cancel at least one of a registration relationship between the hub device and the server or a registration relationship between the registered device and the server comprises:
sending a first unbinding instruction to the server, wherein the first unbinding instruction instructs the server to cancel the registration relationship between the registered device and the server; and
sending a second unbinding instruction to the server after the registration relationship between the registered device and the server is canceled, wherein the second unbinding instruction instructs the server to cancel the registration relationship between the hub device and the server.

4. The method according to claim 3, wherein after the sending a first unbinding instruction to the server, the method further comprises:
restoring the registration relationship between the hub device and the registered device.

5. The method according to claim 1, wherein after the registering a target device with the hub device, the method further comprises:
receiving control information sent by third user equipment, wherein the control information comprises a device identifier of a to-be-controlled registered device and a control instruction; and
forwarding the control instruction to the registered device corresponding to the device identifier.

6. The method according to claim 1, wherein after the registering a target device with the hub device, the method further comprises:
determining a to-be-controlled registered device and a control instruction in response to a control operation of a user; and
sending the control instruction to the to-be-controlled registered device.

7. A method for device registration, wherein the method comprises:
registering, by a hub device, a target device with the hub device with assistance of first user equipment;
registering, by the hub device, the hub device with a server with assistance of second user equipment, wherein the second user equipment and the first user equipment are same user equipment or different user equipment; and
registering, by the hub device, a registered device with the server after the hub device registers the hub device with the server, wherein the registered device comprises the target device that is registered with the hub device.

8. The method according to claim 7, wherein the method further comprises:
instructing, by the hub device, the server to cancel at least one of a registration relationship between the hub device and the server or a registration relationship between the registered device and the server after obtaining a status restoration instruction.

9. The method according to claim 8, wherein the instructing, by the hub device, the server to cancel at least one of a registration relationship between the hub device and the server or a registration relationship between the registered device and the server after obtaining a status restoration instruction specifically comprises:
sending, by the hub device, a first unbinding instruction to the server after obtaining the status restoration instruction;
canceling, by the server, the registration relationship between the registered device and the server in response to the first unbinding instruction;
sending, by the hub device, a second unbinding instruction to the server after the registration relationship between the registered device and the server is canceled; and
canceling, by the server, the registration relationship between the hub device and the server in response to the second unbinding instruction.

10. The method according to claim 9, wherein after the sending a first unbinding instruction to the server, the method further comprises:
restoring, by the hub device, the registration relationship between the hub device and the registered device.

11. The method according to claim 7, wherein the registering, by a hub device, a target device with the hub device with assistance of first user equipment specifically comprises:
determining, by the first user equipment, the target device in response to a device registration operation of a user, and sending a first registration request to the hub device;
sending, by the hub device, a first registration code to the first user equipment in response to the first registration request;
sending, by the first user equipment, the first registration code to the target device;
sending, by the target device, the first registration code to the hub device; and
registering, by the hub device, the target device with the hub device in response to receiving the first registration code.

12. The method according to claim 7, wherein the registering, by the hub device, the hub device with a server with assistance of second user equipment specifically comprises:
sending, by the second user equipment, a second registration request to the server in response to a device delivery operation of a user;
sending, by the server, a second registration code to the second user equipment in response to the second registration request;
sending, by the second user equipment, the second registration code to the hub device; and
registering, by the hub device, the hub device with the server in response to receiving the second registration code.

13. The method according to claim 7, wherein after the registering, by a hub device, a target device with the hub device, the method further comprises:

determining, by third user equipment, a to-be-controlled registered device and a control instruction in response to a control operation of the user;

sending, by the third user equipment, control information to the hub device, wherein the control information comprises a device identifier of the to-be-controlled registered device and the control instruction; and in response to receiving the control information, forwarding, by the hub device, the control instruction to the registered device corresponding to the device identifier.

14. The method according to claim 7, wherein after the registering, by a hub device, a target device with the hub device, the method further comprises:

determining, by the hub device, a to-be-controlled registered device and a control instruction in response to a control operation of the user; and sending, by the hub device, the control instruction to the to-be-controlled registered device.

15. A hub device, comprising at least one memory and at least one processor coupled to the at least one memory, wherein the at least one memory stores programming instructions for execution by the at least one processor to cause the hub device to perform operations comprising:

sending a first registration code to first user equipment in response to a first registration request sent by the first user equipment;

registering a target device with the hub device after receiving the first registration code sent by the target device;

receiving a second registration code sent by second user equipment, wherein the second user equipment and the first user equipment are same user equipment or different user equipment;

registering the hub device with a server based on the second registration code; and registering a registered device with the server after the hub device is registered with the server, wherein the registered device comprises the target device that is registered with the hub device.

16. The hub device according to claim 15, wherein the operations further comprise:

instructing the server to cancel at least one or a registration relationship between the hub device and the server or a registration relationship between the registered device and the server after obtaining a status restoration instruction.

17. The hub device according to claim 16, wherein the instructing the server to cancel at least one of a registration relationship between the hub device and the server or a registration relationship between the registered device and the server comprises:

sending a first unbinding instruction to the server, wherein the first unbinding instruction instructs the server to cancel the registration relationship between the registered device and the server; and sending a second unbinding instruction to the server after the registration relationship between the registered device and the server is canceled, wherein the second unbinding instruction instructs the server to cancel the registration relationship between the hub device and the server.

18. The hub device according to claim 17, wherein after the sending a first unbinding instruction to the server, the operations further comprise:

restoring the registration relationship between the hub device and the registered device.

19. The hub device according to claim 15, wherein after the registering a target device with the hub device, the operations further comprise:

receiving control information sent by third user equipment, wherein the control information comprises a device identifier of a to-be-controlled registered device and a control instruction; and forwarding the control instruction to the registered device corresponding to the device identifier.

20. The hub device according to claim 15, wherein after the registering a target device with the hub device, the operations further comprise:

determining a to-be-controlled registered device and a control instruction in response to a control operation of a user; and sending the control instruction to the to-be-controlled registered device.

* * * * *